(12) United States Patent
Gupta et al.

(10) Patent No.: US 11,139,939 B2
(45) Date of Patent: Oct. 5, 2021

(54) FEEDBACK USING WIDEBAND CSI

(71) Applicant: QUALCOMM Incorporated, San Diego, CA (US)

(72) Inventors: Piyush Gupta, Bridgewater, NJ (US); Junyi Li, Chester, NJ (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 16/433,948

(22) Filed: Jun. 6, 2019

(65) Prior Publication Data

US 2019/0379510 A1  Dec. 12, 2019

Related U.S. Application Data

(60) Provisional application No. 62/682,575, filed on Jun. 8, 2018.

(51) Int. Cl.
*H04W 24/08* (2009.01)
*H04L 5/00* (2006.01)

(52) U.S. Cl.
CPC .......... *H04L 5/0053* (2013.01); *H04L 5/0048* (2013.01); *H04W 24/08* (2013.01)

(58) Field of Classification Search
CPC ..... H04W 24/08; H04L 5/0048; H04L 5/0053
USPC ....................................................... 370/252
See application file for complete search history.

(56) References Cited

U.S. PATENT DOCUMENTS

2013/0279363 A1* 10/2013 Huang ................. H04W 24/10
370/252

FOREIGN PATENT DOCUMENTS

| EP | 2804425 A1 | 11/2014 |
|---|---|---|
| WO | WO-2014165711 A1 | 10/2014 |
| WO | WO-2017196246 A2 | 11/2017 |

OTHER PUBLICATIONS

Ericsson: "On SRS Fast Switching in NR", 3GPP Draft; R1-1711518, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 26, 2017 (Jun. 26, 2017), pp. 1-3, XP051300703, Retrieved from the Internet: URL:http://www.3gpp.org/ftp/Meetings_3GPP_SYNC/RAN1/Docs/.
International Search Report and Written Opinion—PCT/US2019/036122—ISA/EPO—Dec. 10, 2019.

(Continued)

*Primary Examiner* — Angel T Brockman

(74) *Attorney, Agent, or Firm* — Qualcomm Incorporated

(57) ABSTRACT

Techniques for obtaining wideband channel state information (CSI) for a plurality of subbands is described. A two-stage procedure may be used to obtain the wideband CSI. At a first stage, a base station may broadcast a wideband channel state information reference signal (CSI-RS) that includes a plurality of subbands. The wideband CSI-RS may be received by any user equipment (UE) within range of the base station. The UE may select one or more subbands in the wideband CSI-RS for communication with the base station. To indicate which subbands were selected, at a second stage, the UE may transmit a narrowband sounding reference signal (SRS) in each of the selected subbands. The base station may schedule traffic for the wireless communications system based on the narrowband SRSs.

26 Claims, 16 Drawing Sheets

(56) References Cited

OTHER PUBLICATIONS

Huawei et al: "Discussion on Reciprocity based CSI Acquisition Mechanism," 3GPP Draft; R1-1708137, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017, XP051273333, 10 Pages, Retrieved from the Internet: URL: http://www.3gpp.org/ftp/Meetings_3GPP_SYNC/RAN1/Docs/ [retrieved on May 14, 2017] Section 2.
Partial International Search Report—PCT/US2019/036122—ISA/EPO—dated Sep. 23, 2019.
Sony: "Views on Multiple SRS Resource Setting for NR," 3GPP Draft; R1-1703135, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017, XP051210272, 4 pages, Retrieved from the Internet: URL: http://www.3gpp.org/ftp/Meetings_3GPP_SYNC/RAN1/Docs/ [retrieved on Feb. 12, 2017] Section 2.

* cited by examiner

FEEDBACK USING WIDEBAND CSI

CROSS REFERENCE

The present application for patent claims the benefit of U.S. Provisional Patent Application No. 62/682,575 by GUPTA et al., entitled "FEEDBACK USING WIDEBAND CSI," filed Jun. 8, 2018, assigned to the assignee hereof, and expressly incorporated by reference herein.

BACKGROUND

The following relates generally to wireless communications, and to feedback using wideband channel state information (CSI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support feedback using wideband channel state information (CSI). Generally, the described techniques provide for obtaining wideband CSI for a plurality of subbands. A two-stage procedure may be used to obtain the wideband CSI. At a first stage, a base station may broadcast a wideband channel state information reference signal (CSI-RS) that includes a plurality of subbands. The wideband CSI-RS may be received by any user equipment (UE) within range of the base station. The UE may receive wideband CSI-RSs from a plurality of base stations. The UE may select one or more subbands in the wideband CSI-RS for communication with the base station. To indicate which subbands were selected, at a second stage, the UE may transmit a narrowband sounding reference signal (SRS) in each of the selected subbands. The base station may schedule traffic for the wireless communications system based on the narrowband SRSs.

A method of wireless communication by a UE is described. The method may include receiving a wideband CSI-RS from a base station, the wideband CSI-RS including a set of subbands, identifying a characteristic of the received wideband CSI-RS, selecting a subband from the set of subbands based on the identified characteristic of the received wideband CSI-RS, and transmitting a narrowband SRS based on the selected subband, where the narrowband SRS is associated with the selected subband.

An apparatus for wireless communication by a UE is described. The apparatus may include a processor, memory coupled with the processor, and instructions stored in the memory. The instructions may be executable by the processor to cause the apparatus to receive a wideband CSI-RS from a base station, the wideband CSI-RS including a set of subbands, identify a characteristic of the received wideband CSI-RS, select a subband from the set of subbands based on the identified characteristic of the received wideband CSI-RS, and transmit a narrowband SRS based on the selected subband, where the narrowband SRS is associated with the selected subband.

Another apparatus for wireless communication by a UE is described. The apparatus may include means for receiving a wideband CSI-RS from a base station, the wideband CSI-RS including a set of subbands, identifying a characteristic of the received wideband CSI-RS, selecting a subband from the set of subbands based on the identified characteristic of the received wideband CSI-RS, and transmitting a narrowband SRS based on the selected subband, where the narrowband SRS is associated with the selected subband.

A non-transitory computer-readable medium storing code for wireless communication by a UE is described. The code may include instructions executable by a processor to receive a wideband CSI-RS from a base station, the wideband CSI-RS including a set of subbands, identify a characteristic of the received wideband CSI-RS, select a subband from the set of subbands based on the identified characteristic of the received wideband CSI-RS, and transmit a narrowband SRS based on the selected subband, where the narrowband SRS is associated with the selected subband.

Some examples of the method, apparatuses, and non-transitory computer-readable medium described herein may further include operations, features, means, or instructions for determining the characteristic of the wideband CSI-RS satisfies a threshold for the selected subband, where selecting the subband may be based on determining the characteristic of the wideband CSI-RS satisfies the threshold.

Some examples of the method, apparatuses, and non-transitory computer-readable medium described herein may further include operations, features, means, or instructions for identifying a set of subbands common to each of a set of wideband CSI-RSs, the characteristic of each subband in the set of subbands satisfying a threshold, where the selected subband may be included in the set of subbands.

In some examples of the method, apparatuses, and non-transitory computer-readable medium described herein, transmitting the narrowband SRS further may include operations, features, means, or instructions for transmitting the narrowband SRS on the selected subband.

In some examples of the method, apparatuses, and non-transitory computer-readable medium described herein, transmitting the narrowband SRS further may include operations, features, means, or instructions for transmitting the narrowband SRS in a first slot that may be different from a second slot used to transmit one or more additional narrowband SRSs.

In some examples of the method, apparatuses, and non-transitory computer-readable medium described herein, the narrowband SRS may be transmitted to a set of base stations that includes the base station and one or more additional base stations.

Some examples of the method, apparatuses, and non-transitory computer-readable medium described herein may further include operations, features, means, or instructions for receiving a message that allocates resources to the UE for communication with the base station based on transmitting the narrowband SRS, the resources being allocated for the selected subband.

Some examples of the method, apparatuses, and non-transitory computer-readable medium described herein may further include operations, features, means, or instructions for communicating with the base station using the selected subband based on transmitting the narrowband SRS.

In some examples of the method, apparatuses, and non-transitory computer-readable medium described herein, the characteristic may be a channel quality indicator (CQI), a rank indicator (RI), a precoder matrix indicator (PMI), or a combination thereof.

In some examples of the method, apparatuses, and non-transitory computer-readable medium described herein, the wideband CSI-RS may be communicated in a coordinated multipoint (CoMP) environment.

In some examples of the method, apparatuses, and non-transitory computer-readable medium described herein, the wideband CSI-RS may be communicated in a factory automation environment where a number of UEs exceeds a number of base stations.

A method of wireless communication by a base station is described. The method may include broadcasting a wideband CSI-RS, the wideband CSI-RS including a set of subbands, receiving a narrowband SRS from a UE based on broadcasting the wideband CSI-RS, the narrowband SRS received by the base station indicating a subband of the set of subbands selected by the UE for communication, and communicating with the UE using the subband associated with the narrowband SRS received from the UE.

An apparatus for wireless communication by a base station is described. The apparatus may include a processor, memory coupled with the processor, and instructions stored in the memory. The instructions may be executable by the processor to cause the apparatus to broadcast a wideband CSI-RS, the wideband CSI-RS including a set of subbands, receive a narrowband SRS from a UE based on broadcasting the wideband CSI-RS, the narrowband SRS received by the base station indicating a subband of the set of subbands selected by the UE for communication, and communicate with the UE using the subband associated with the narrowband SRS received from the UE.

Another apparatus for wireless communication by a base station is described. The apparatus may include means for broadcasting a wideband CSI-RS, the wideband CSI-RS including a set of subbands, receiving a narrowband SRS from a UE based on broadcasting the wideband CSI-RS, the narrowband SRS received by the base station indicating a subband of the set of subbands selected by the UE for communication, and communicating with the UE using the subband associated with the narrowband SRS received from the UE.

A non-transitory computer-readable medium storing code for wireless communication by a base station is described. The code may include instructions executable by a processor to broadcast a wideband CSI-RS, the wideband CSI-RS including a set of subbands, receive a narrowband SRS from a UE based on broadcasting the wideband CSI-RS, the narrowband SRS received by the base station indicating a subband of the set of subbands selected by the UE for communication, and communicate with the UE using the subband associated with the narrowband SRS received from the UE.

In some examples of the method, apparatuses, and non-transitory computer-readable medium described herein, receiving the narrowband SRS further may include operations, features, means, or instructions for receiving the narrowband SRS over the subband selected by the UE.

In some examples of the method, apparatuses, and non-transitory computer-readable medium described herein, receiving the narrowband SRS further may include operations, features, means, or instructions for receiving the narrowband SRS in a first slot that may be different than a second slot used to receive one or more additional narrowband SRSs.

Some examples of the method, apparatuses, and non-transitory computer-readable medium described herein may further include operations, features, means, or instructions for transmitting a message to the UE that allocates resources to the UE for communication based on receiving the narrowband SRS from the UE.

Some examples of the method, apparatuses, and non-transitory computer-readable medium described herein may further include operations, features, means, or instructions for selecting at least one subband associated with a set of narrowband SRSs received from the UE, where communicating with the UE may be based on selecting the at least one subband.

In some examples of the method, apparatuses, and non-transitory computer-readable medium described herein, the wideband CSI-RS may be communicated in a CoMP environment.

In some examples of the method, apparatuses, and non-transitory computer-readable medium described herein, the wideband CSI-RS may be communicated in a factory automation environment where a number of UEs exceeds a number of base stations.

Some examples of the method, apparatuses, and non-transitory computer-readable medium described herein the narrowband SRSs may be received from a set of UEs.

DETAILED DESCRIPTION

In some environments, such as factories, base stations and/or user equipment (UEs) may be densely deployed in a small area. The environment may include many objects that may cause interference, reflection, or blocking of wireless signals communicated as part of a wireless communications system. Such objects may cause fading, shadowing, or other effects that reduce the signal quality of wireless signals communicated between base stations and UEs. Further, such objects may move throughout the environment causing the network topology to change. In such environments, the base station may attempt to gather channel state information (CSI) for a wide frequency range. Such information may allow base stations more flexibility in scheduling resources for the UEs.

Techniques for obtaining wideband CSI for a plurality of subbands is described. A two-stage procedure may be used to obtain the wideband CSI. At a first stage, a base station may broadcast a wideband channel state information reference signal (CSI-RS) that includes a plurality of subbands. The wideband CSI-RS may be received by any UE within range of the base station. The UE may receive wideband CSI-RSs from a plurality of base stations. The UE may select one or more subbands in the wideband CSI-RS for communication with the base station. To indicate which subbands were selected, at a second stage, the UE may transmit a narrowband sounding reference signal (SRS) in each of the selected subbands. The base station may schedule traffic for the wireless communications system based on the narrowband SRSs.

Aspects of the disclosure are initially described in the context of a wireless communications system. Aspects of the disclosure are described in the context of systems and process flows. Aspects of the disclosure are further illustrated by and described with reference to apparatus diagrams, system diagrams, and flowcharts that relate to feedback using wideband CSI.

Figure 1:
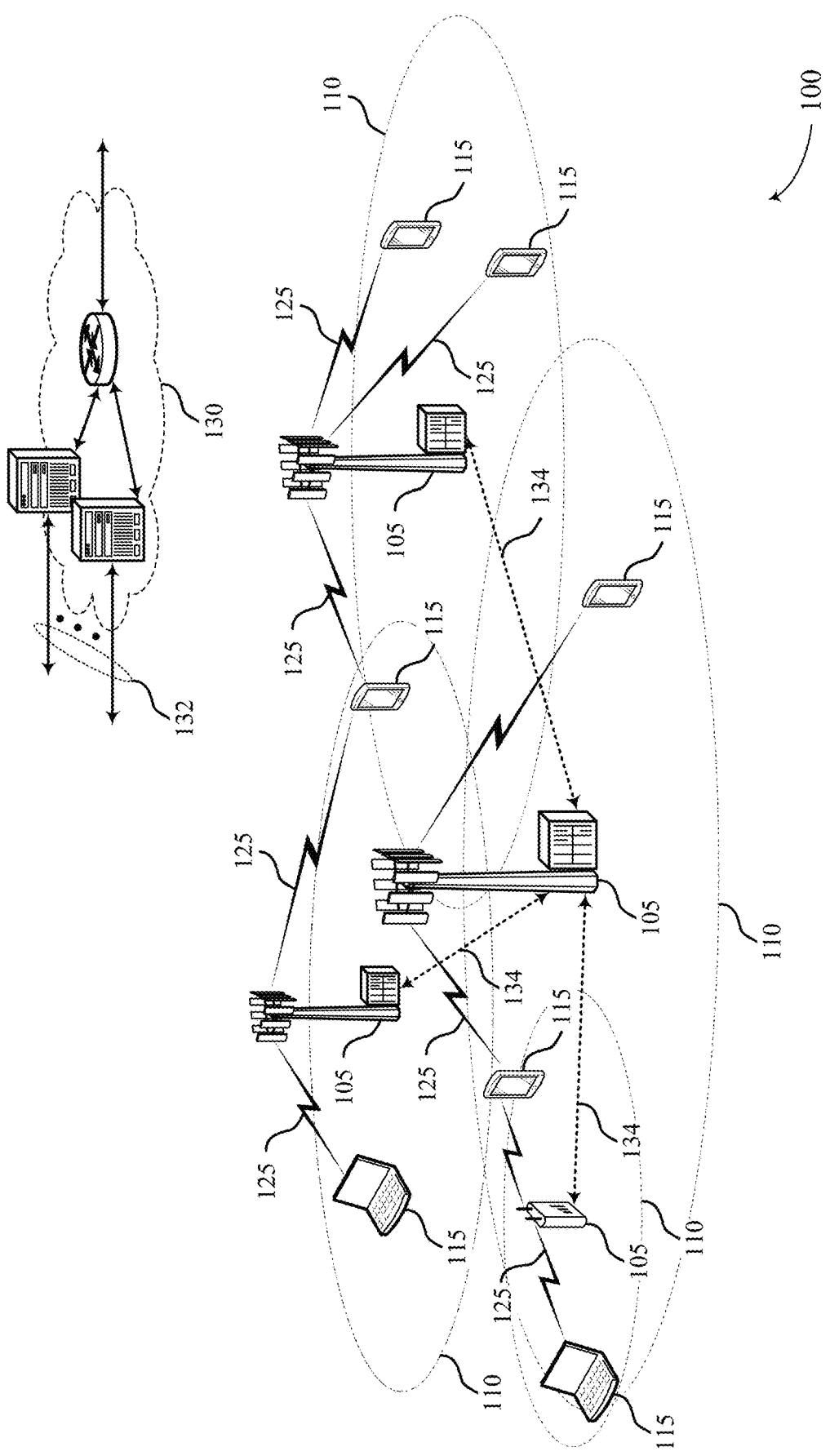
FIG. 1 shows an example of a wireless communications system that supports feedback using wideband CSI in accordance with aspects of the present disclosure.

FIG. 1 shows an example of a wireless communications system 100 that supports feedback using wideband CSI in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving the geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support some functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each UE 115 served by the carrier may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHZ) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, the base stations 105 and the UEs 115 may be configured to implement a two-stage procedure to gather CSI for a wideband of frequency. The base stations 105 may transmit wideband CSI-RSs. The UEs 115 may select subbands included in the wideband CSI-RSs that the UE 115 prefers to use for communication with the base station 105. The UE 115 may transmit a narrowband SRS for each selected subband. The narrowband SRS may be configured to indicate the subbands selected by the UE 115 and/or provide feedback (e.g., indirectly) about CSI to the base stations 105. The base station 105 and the UE 115 may communicate using at least one of the selected subbands.

Figure 2:
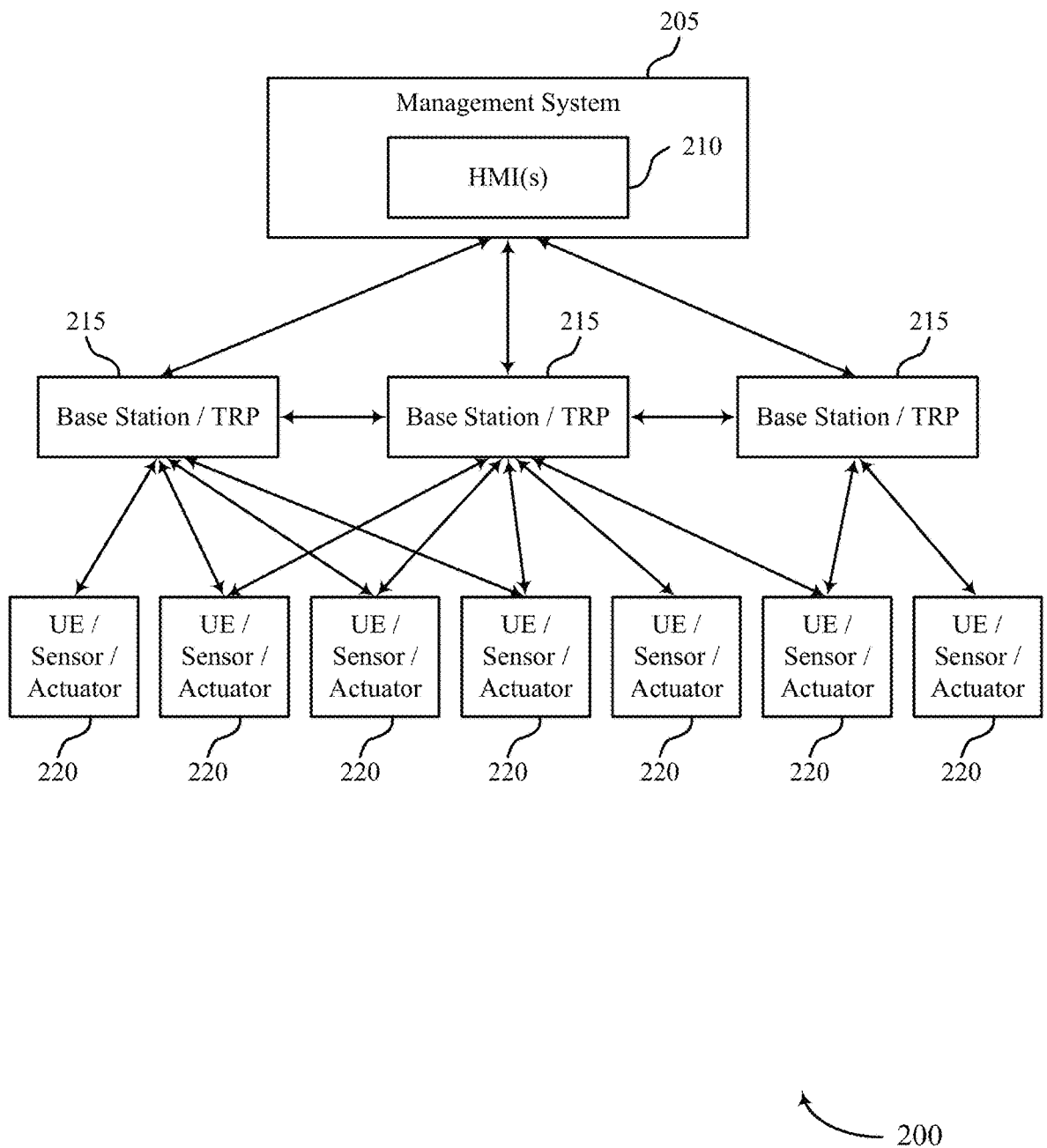
FIG. 2 shows an example of a wireless communications system that supports feedback using wideband CSI in accordance with aspects of the present disclosure.

FIG. 2 shows an example of a wireless communications system 200 that supports feedback using wideband CSI in accordance with aspects of the present disclosure. In some examples, the wireless communications system 200 may implement aspects of wireless communications system 100. The wireless communications system 200 may include wired communication links between network devices and/or wireless communication links between network devices.

The wireless communications system 200 may include a management system 205, one or more human-machine interfaces (HMIs) 210, base stations 215, and one or more UEs 220.

In some cases, the wireless communications system 200 may be deployed in a factory environment. In such environments, the wireless communications system 200 may be configured to communicate data with individual devices in the factory. Each device in an automated factory environment may be configured with one or more sensors and/or one or more actuators. The sensors may be configured to collect information about the device. For example, the sensors may be configured to collect location information about the device, movement information about the device, information about the conditions of the device (e.g., temperature, fluid level, or battery life), environmental information, other information, or a combination thereof. The actuators may be configured to cause one or more aspects of the device to move in response to an electrical signal. Examples of actuators may be a rotary motor, a linear servo, other actuators, or a combination thereof.

The management system 205 of an automated factory may be configured to control the operations of the devices in the factory or the manufacturing plant. To exert such control, the management system 205 may gather information from sensors of the devices and communicate commands to the actuators of the devices. To make such communications possible, the wireless communications system 200 may be deployed in the automated factory. The management system 205 may be any combination of hardware, firmware, or software capable of performing the functions described herein. An HMI 210 may be any combination of hardware, firmware or software configured to allow a human to receive information from or issue commands to the management system 205, the base stations 215, the UEs 220, and/or the devices, sensors, or actuators associated with the UEs 220, or a combination thereof.

The wireless communications system 200 may include a plurality of base stations 215, which may be referred to as transmission-reception points (TRPs) or programmable logic controllers (PLCs). The base stations 215 may be configured to establish communication links (e.g., wired or wireless) with the management system 205, other base stations 215, and/or with the UEs 220. The base stations 215 may be examples of the base stations 105 described with reference to FIG. 1.

The UEs 220 may be an endpoint of the wireless communications system 200. In some cases, a device with a plurality of sensors and/or actuators may have a single UE 220. In some cases, individual sensors and/or individual actuators may have a UE 220. The UEs 220 may be examples of the UEs 115 described with reference to FIG. 1.

In some environments, such as factories, base stations 215 and/or UEs 220 may be densely deployed in a small area. In some of these environments, the number of UEs 220 deployed in a given area may exceed that of the number of base stations 215 deployed in the given area. The environment may include many objects that may cause interference (e.g., inter-cell interference), reflection, or blocking of wireless signals. Such objects may cause fading, shadowing, or other effects that reduce the signal quality of wireless signals communicated between base stations 215 and UEs 220. Further, such objects may move throughout the environment causing the network topology to change frequently.

In some cases where environments have dense deployments of devices, the wireless communications system 200 may be an example of a coordinated multipoint (CoMP)

communications system. A CoMP wireless communications system may be configured to provide dynamic coordination of transmission and reception with a UE over a variety of different base stations. The CoMP wireless communications systems may also be configured to improve a signal quality at individual UEs 220 as well as improving the utilization of the wireless network.

In some environments, communications may have quality of service (QoS) requirements (e.g., a reliability requirement or a latency requirement). Communications in some environments may be an example of ultra-reliable low-latency communications (URLLC).

To maintain a good CoMP cluster for serving a UE 220 with high reliability and/or low latency, the network (e.g., management system 205 and/or base stations 215) may want to have CSI for a broad spectrum of frequency bands or a broad range of subbands. The more subbands that the network has CSI information for, the better able the network is to maintain a good communication link with a UE 220 in a CoMP wireless communications system. Obtaining CSI for a wide spectrum of subbands may introduce overhead signaling into the wireless communications system 200, thereby reducing the efficiency of the network and making it more difficult to meet QoS requirements.

Techniques for obtaining wideband CSI for a plurality of subbands is described. A two-stage procedure may be used to obtain wideband CSI. At a first stage, a base station 215 may broadcast a wideband CSI-RS that includes a plurality of subbands. The wideband CSI-RS may be received by any UE 220 within range of the base station 215. The UE 220 may receive wideband CSI-RSs from a plurality of base stations 215. The UE 220 may select one or more subbands in the wideband CSI-RS for communication with the base station 215. At a second stage, the UE 220 may transmit a narrowband SRS in each of the selected subbands to indicate which subbands were selected. The base station 215 may schedule traffic for the wireless communications system based on the narrowband SRSs.

Figure 3:
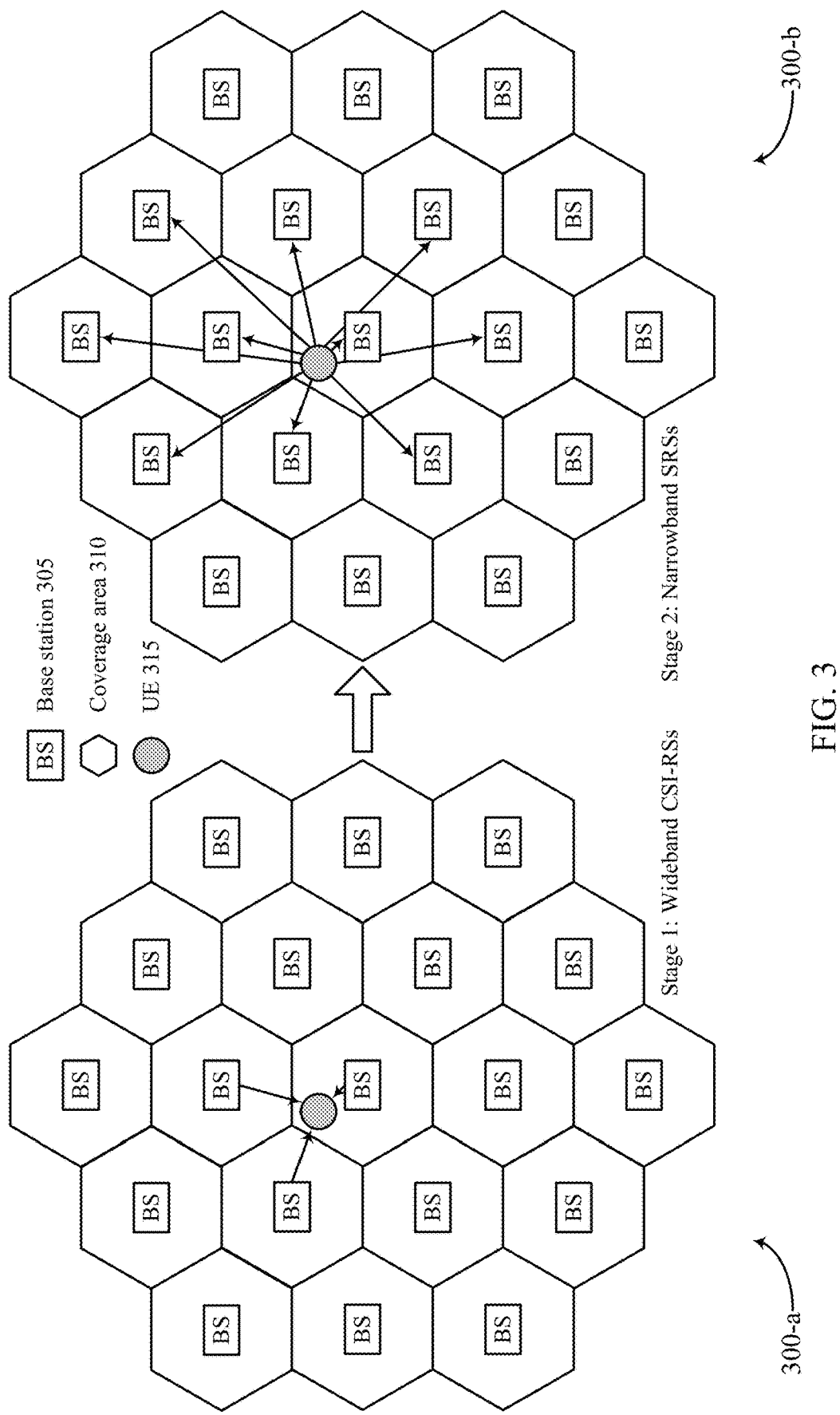
FIG. 3 shows an example of a system that supports feedback using wideband CSI in accordance with aspects of the present disclosure.

FIG. 3 shows an example of a system 300 that supports feedback using wideband CSI in accordance with aspects of the present disclosure. In some examples, the system 300 may implement aspects of the wireless communications systems 100 or 200. The system 300 may illustrate a two-stage procedure for obtaining wideband CSI in a wireless communications system. A first system 300-a may illustrate the first-stage of the two-stage procedure and the second system 300-b may illustrate the second-stage of the two-stage procedure.

The system 300 may include a plurality of base stations 305 (sometimes denoted BSs or TRPs), each associated with a geographic coverage area 310. The geographic coverage areas 310 of the base stations 305 may overlap in some cases. A plurality of UEs 315 may be positioned in the geographic coverage areas 310 of the base stations 305. In the systems 300-a and 300-b, a single UE 315 is shown to illustrate the two-stage procedure. In some cases, however, the geographic areas may include a plurality of UEs 315. In fact, in some cases, the number of UEs 315 in an area may exceed the number of base stations 305. The base stations 305 may be examples of the base stations 105 and/or 215 described with reference to FIGS. 1 and 2. The UEs 315 may be examples of the UEs 115 and/or 220 described with reference to FIGS. 1 and 2.

A first-stage of the procedure, as shown in system 300-a, may include one or more base stations 305 broadcasting wideband CSI-RSs. A wideband CSI-RS may be received by a plurality of UEs 315. A single UE 315 may receive a plurality of wideband CSI-RSs broadcast by a plurality of base stations 305.

A base station 305 may broadcast a wideband CSI-RS that includes a plurality of subbands because the base stations 305 may not know which subbands the UE 315 may prefer to use for communication. By spanning a wide-range of subbands and/or frequency bands, the wideband CSI-RS may provide an opportunity for a wide range of feedback information.

In some cases, the wideband CSI-RSs may be broadcast with a transmit power limitation. Wideband signals may interfere with other signals. To mitigate interference caused by wideband signals, the wideband CSI-RSs may be broadcast with a more limited transmit power, thereby reducing the range of the wideband CSI-RSs.

The UE 315, upon receiving one or more wideband CSI-RSs, may select one or more subbands for communication. The UE 315 may identify characteristics of the received CSI-RSs and determine whether those measured characteristics satisfy a threshold. Examples of the characteristics may include a channel quality indicator (CQI), a rank indicator (RI), a precoder matrix indicator (PMI), signal-to-noise ratio (SNR), signal-to-interference plus noise ratio (SINR), signal-to-noise plus distortion ratio (SNDR), block error rate (BLER), reference signal received power (RSRP), reference signal received quality (RSRQ), received signal strength indicator (RSSI), or a combination thereof. In some cases, the UE 315 may determine characteristics of individual subbands of the plurality of subbands in a wideband CSI-RS.

In some cases, when multiple wideband CSI-RSs are received, the UE 315 may select subbands for communication that satisfy the threshold in each of the wideband CSI-RSs. In such cases, the UE 315 may be looking for subbands that are ready for communication with a variety of base stations 305.

A second-stage of the procedure, as shown in system 300-b, may include one or more UEs 315 (shown as a single UE 315) broadcasting one or more narrowband SRSs. The UE 315 may broadcast a narrowband SRS for each subband selected by the UE 315 for communication. In some cases, the narrowband SRSs may be broadcast using the selected subbands.

The UE 315 may broadcast the narrowband SRSs with a greater transmit power than the wideband CSI-RSs are transmitted because of the narrowband nature of the signal. The narrowband SRSs may span a narrower frequency spectrum than the wideband CSI-RSs and, therefore, may cause less interference. In some cases, the narrowband SRSs transmitted by the UE 315 may be received by a set of base stations 305 that is greater in number than the set of base stations 305 from which the UE 315 received a wideband CSI-RS.

The narrowband SRSs may indicate to the base stations 305 which subbands were selected by the UE 315 for communication. In some cases, the narrowband SRSs may provide an indication of CSI to the base stations 305 without the UE 315 explicitly transmitting a feedback message to the base stations 305. Such a configuration may reduce the overhead of the two-stage procedure as compared to other methods. For example, the UE 315 may not be configured to explicitly communicate CQI, RI, or PMI back to the base stations 305. Rather, the UE 315 may consider those characteristics, select subbands for communication, and then indicate the selected subbands to the base stations 305 using narrowband SRSs.

The UE 315 may transmit any number of narrowband SRSs to the base stations 305. Because the narrowband SRSs may be used to indicate subbands selected for communication by the UE 315 based on CSI, the UE 315 may transmit or broadcast a narrowband SRS for each selected subband to provide the network (e.g., management system or base stations) with feedback information for managing the network. In some cases, the narrowband SRSs may be transmitted during different time resources (e.g., slots, subframes) because of peak-to-average power ratio (PAPR) constraints.

The base station 305 may perform load-balancing of the network based on the narrowband SRSs received from the UEs 315. In densely deployed environments, it may be difficult to maintain quality communication links with each UE 315. The network (e.g., management system and/or base stations) may select one or more subbands to allocate to a given UE 315 based on a load balancing procedure. During the load balancing procedure, the network may try to ensure that every UE 315 is served by at least one subband selected by that UE 315. The subband selected by the network to be allocated to the UE 315 may be a subset of the subbands selected by the UE 315 for communication.

In environments where the number of base stations 305 is smaller than the number of UEs 315, the two-stage procedure may keep the reference signal usage lower than approaches that use wideband SRSs. The two-stage procedure may also avoid UE power constraint issues that may reduce CSI quality in wideband SRS approaches. Further, the two-stage approach may allow the wireless communications network to meet more stringent QoS requirements than approaches that use frequency-hopping of narrowband SRSs. Frequency-hopping approaches may cause extra delays in priority communications.

Figure 4:
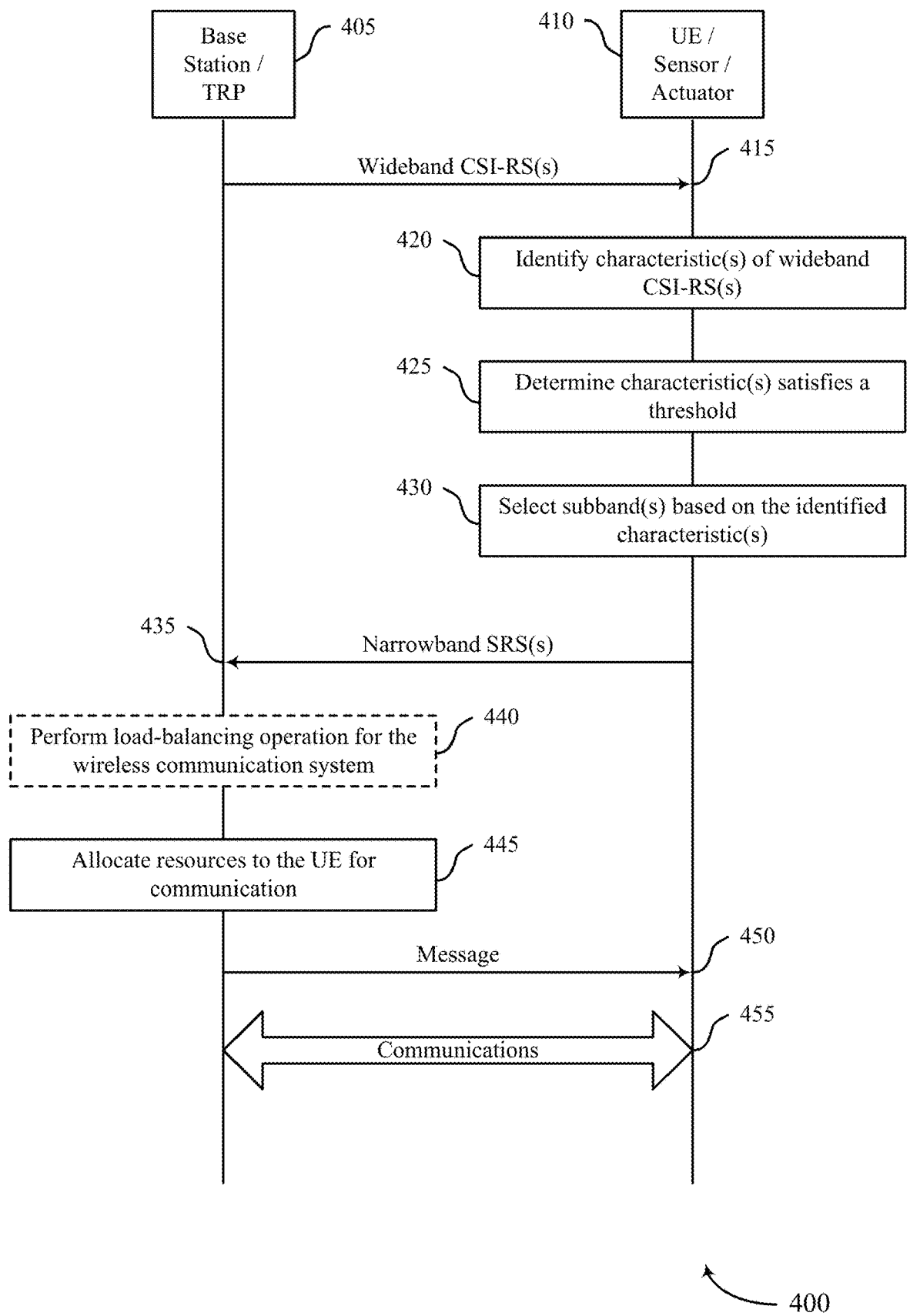
FIG. 4 shows an example of a process flow that supports feedback using wideband CSI in accordance with aspects of the present disclosure.

FIG. 4 shows an example of a process flow 400 that supports feedback using wideband CSI in accordance with aspects of the present disclosure. In some examples, the process flow 400 may implement aspects of the wireless communications systems 100 or 200. The process flow 400 may illustrate a two-stage procedure for obtaining feedback for wideband CSI. The two-stage procedure may broadly include broadcasting wideband CSI-RSs by base stations and broadcasting narrowband SRSs by UEs to indicate subbands with good channel conditions. The process flow 400 may illustrate processes, operations, procedures and/or communications performed by or communicated between a base station 405 and a UE 410. The base station 405 may be an example of a base station 105, 215, 305 described with reference to FIGS. 1-3. The UE 410 may be an example of a UE 115, 220, 315 described with reference to FIGS. 1-3.

The base station 405 may broadcast a wideband CSI-RS 415. The wideband CSI-RS 415 may include a plurality of subbands. The purpose of a wideband CSI-RS 415 may be to obtain feedback over a broad range of frequency bands (e.g., subbands). In some environments (e.g., a factory) interference conditions (e.g., fading and shadowing) may make it difficult to maintain high quality wireless communication links with some UEs 410. In some cases, these environments may utilize CoMP wireless communications systems to communicate with UEs 410. By gathering information on a wide range of subbands, the network may be better able to maintain communication links with UEs 410.

A wideband signal, including wideband CSI-RSs 415, may cause interference with other signals. The wider the signal in the frequency spectrum, the greater the likelihood for interference with other signals. Further, wideband signals may reduce the efficiency, reduce the reliability, and/or increase the latency of data communicated using the wireless communications system. To address these issues, the two-stage procedure may use a wideband CSI-RS broadcast by the base stations 405 and narrowband SRSs 435 broadcast by the UEs 410. In environments where the number of UEs 410 may exceed the number of base stations 405, such an asymmetrical use of bandwidth may reduce the likelihood of interference with other signals, as compared to using wideband SRSs. Further, in some cases, the wideband CSI-RS 415 may be transmitted with certain transmit power constraints.

The wideband CSI-RSs 415 may be transmitted by a plurality of base stations 405. In such situations, the UEs 410 may be configured to evaluate multiple wideband CSI-RSs 415 and select subbands using information gathered for each of the wideband CSI-RSs 415.

At block 420, the UE 410 may identify one or more characteristics of the wideband CSI-RS 415 based on receiving the wideband CSI-RS 415. Examples of the one or more characteristics may include SNR, SINR, SNDR, CQI, RI, PMI, RSRP, RSRQ, RSSI, or a combination thereof. The UE 410 may identify these characteristics on a subband-by-subband basis. Using such granularity, the UE 410 may be configured to select subbands for communication using characteristics of each subband.

At block 425, the UE 410 may determine whether the one or more characteristics satisfy a threshold. The threshold may be a value that indicates whether UE 410 prefers the subband for communication with the base station 405. The UE 410 may have different thresholds for each different characteristic. In some cases, to select a subband for communication, a plurality of characteristics of the subband may satisfy a plurality of thresholds. In some cases, a characteristic may have a plurality of associated thresholds that may rank the identified characteristic based on its strength.

At block 430, the UE 410 may select one or more subbands for communication with the base station 405 based on the identified characteristic. In some cases, the UE 410 may select the one or more subbands for communication based on the characteristics satisfying a threshold or a series of thresholds. For example, if the SNR of a subband in the wideband CSI-RS 415 satisfies a threshold, the UE 410 may select the subband for communication. In some cases, the UE 410 may select a subband for communication if a plurality of characteristics of that subband satisfy their respective thresholds. In some cases, the UE 410 may generate a weighted score of characteristics and select subbands based on the weighted score satisfying a threshold.

The UE 410 may transmit one or more narrowband SRSs 435 based on selecting the subbands for communication. In some cases, the narrowband SRS 435 may include fewer subbands (e.g., a single subband) than the wideband CSI-RS 415. Each narrowband SRS 435 may be associated with a selected subband. In some cases, the narrowband SRS 435 indicates to the base station 405 that the UE 410 has selected a particular subband for communication based on the wideband CSI-RS 415. In some cases, the narrowband SRSs 435 are transmitted on the subband associated with the narrowband SRS 435. In such cases, when a base station 405 receives a narrowband SRS 435, the base station 405 may determine that the frequency resources used for the narrowband SRS transmission were selected by the UE 410 for communication. In some cases, narrowband SRSs 435 may be transmitted in different time resources (e.g., slots, subframes, or frames).

At block 440, the base station 405 (or the network more generally) may perform a load-balancing operation for the wireless communication system based on receiving the narrowband SRSs 435 from a plurality of UEs. In dense deployments, certain subbands may be requested more than others. Similarly, certain UEs may have a fairly limited number of subbands that can be used for communication, while other UEs may have a fairly large number of subbands that can be used for communication. The base station 405 and/or the network may evaluate the network topology as a whole and may allocate resources to ensure that the greatest number of UEs are served by a quality communication link. Such load-balancing may enable a large number of UEs 410 to be able to communicate information in a reliable and fast (e.g., low latency) basis.

At block 445, the base station 405 (or the network more generally) may allocate resources to the UE 410 for communication based on receiving the narrowband SRSs 435. The base station 405 may allocate subbands to the UE 410 that were selected by the UE 410 for communication as indicated by narrowband SRSs 435. The base station 405 may select fewer subbands to be allocated to the UE 410 than the UE 410 selected for communication. In some cases, the base station 405 may select subbands for allocation based on the load balancing operation.

The base station 405 may transmit a message 450 to the UE 410 that indicates the resources being allocated to the UE 410. The resources may be allocated for uplink communications or for downlink communications. The message 450 may be an example of a control message.

At block 455, the base station 405 and the UE 410 may be configured to communicate using the allocated resources based at least in part on receiving the messages. The two-stage procedure may be configured to indirectly provide wideband CSI feedback to the base station 405, while efficiently using available spectrum.

Figure 5:
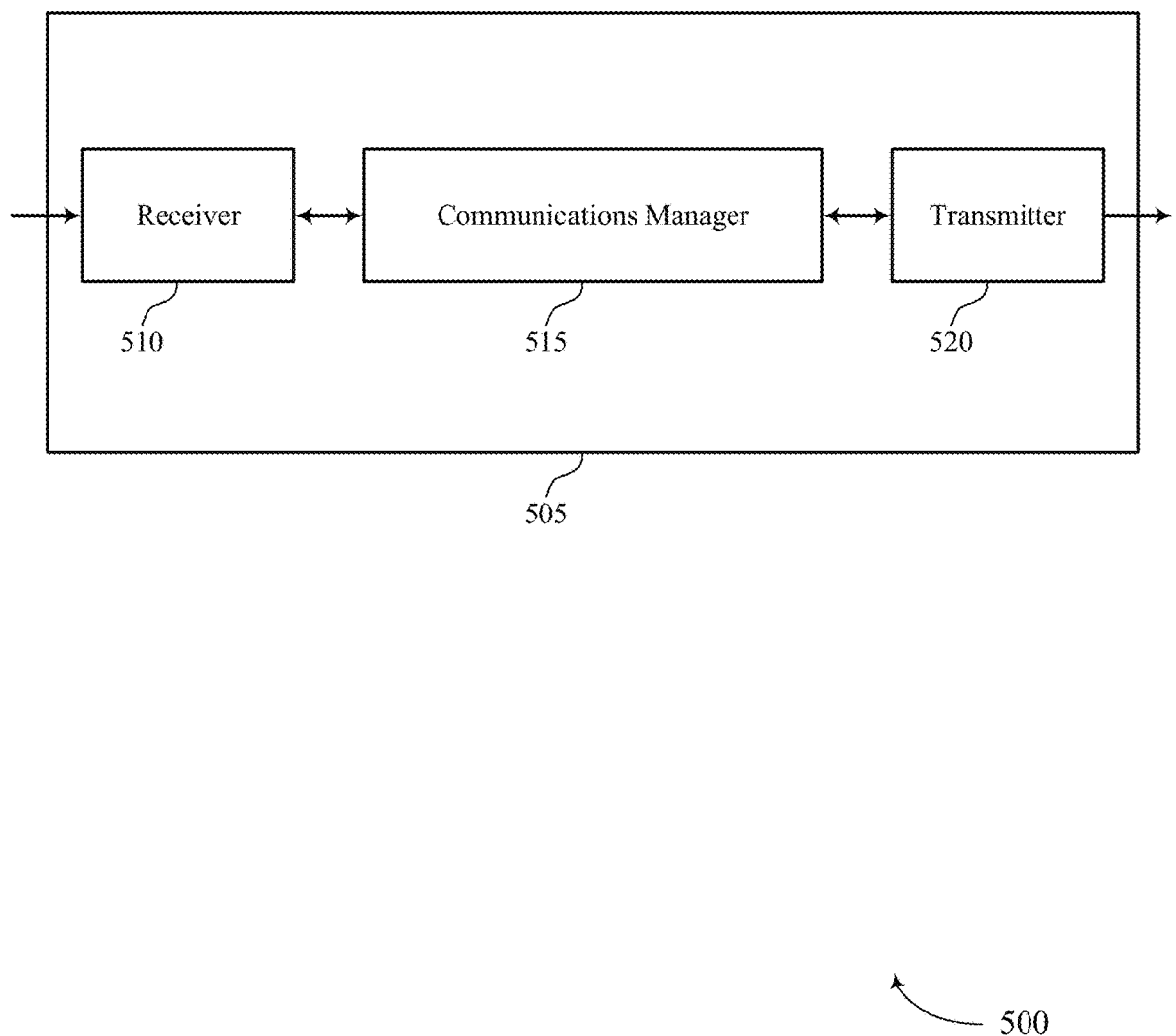
FIGS. 5 and 6 show block diagrams of devices that support feedback using wideband CSI in accordance with aspects of the present disclosure.

FIG. 5 shows a block diagram 500 of a device 505 that supports feedback using wideband CSI in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to feedback using wideband CSI). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a wideband CSI-RS from a base station, the wideband CSI-RS including a set of subbands, identify a characteristic of the received wideband CSI-RS, select a subband from the set of subbands based on the identified characteristic of the received wideband CSI-RS, and transmit a narrowband SRS based on the selected subband, where the narrowband SRS is associated with the selected subband. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
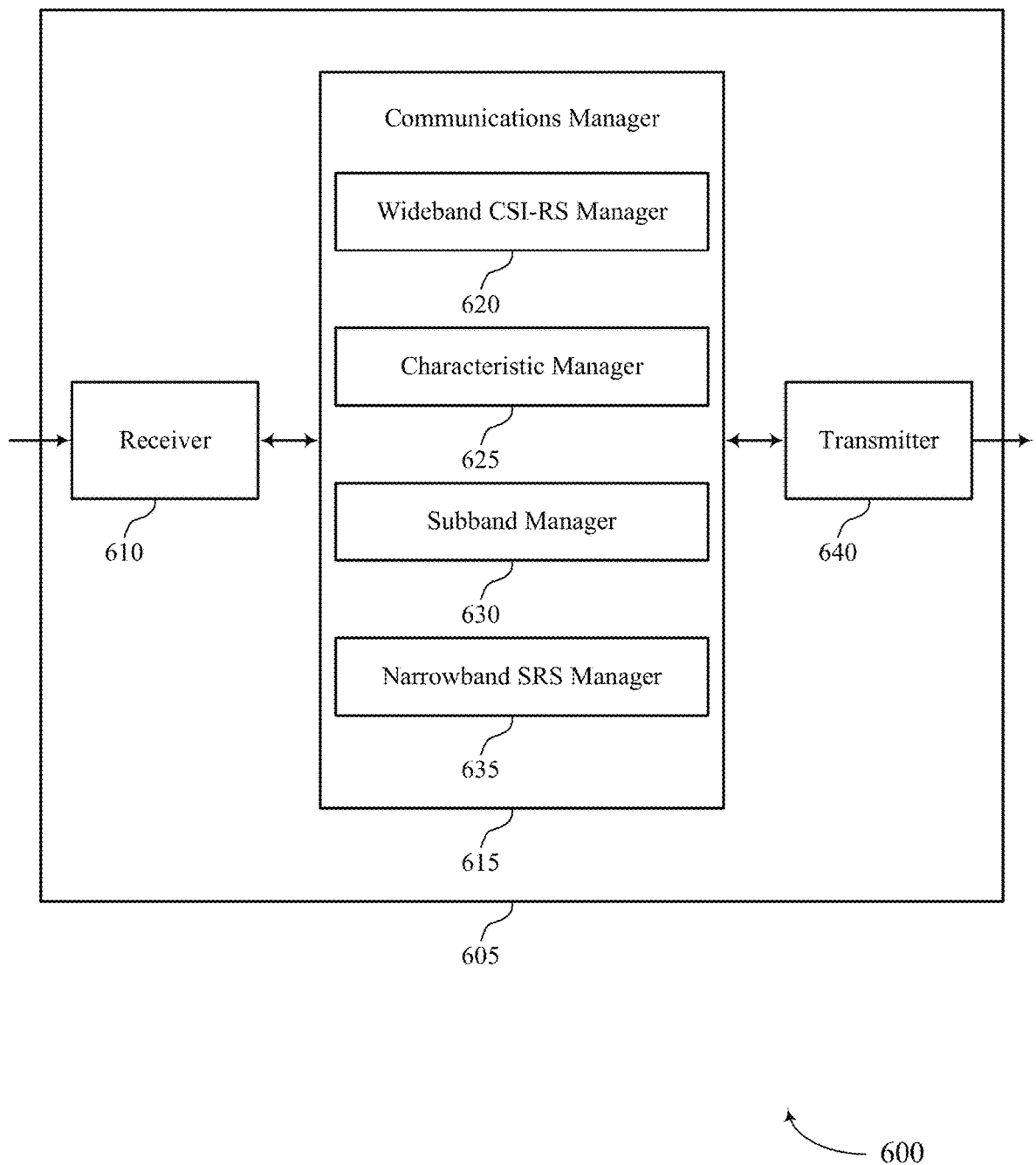

FIG. 6 shows a block diagram 600 of a device 605 that supports feedback using wideband CSI in accordance with aspects of the present disclosure. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to feedback using wideband CSI). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a wideband CSI-RS manager 620, a characteristic manager 625, a subband manager 630, and a narrowband SRS manager 635. The communications manager 615 may be an example of aspects of the communications manager 810 described herein.

The wideband CSI-RS manager 620 may receive a wideband CSI-RS from a base station, the wideband CSI-RS including a set of subbands. The characteristic manager 625 may identify a characteristic of the received wideband CSI-RS. The subband manager 630 may select a subband from the set of subbands based on the identified characteristic of the received wideband CSI-RS. The narrowband SRS manager 635 may transmit a narrowband SRS based on the selected subband, where the narrowband SRS is associated with the selected subband.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
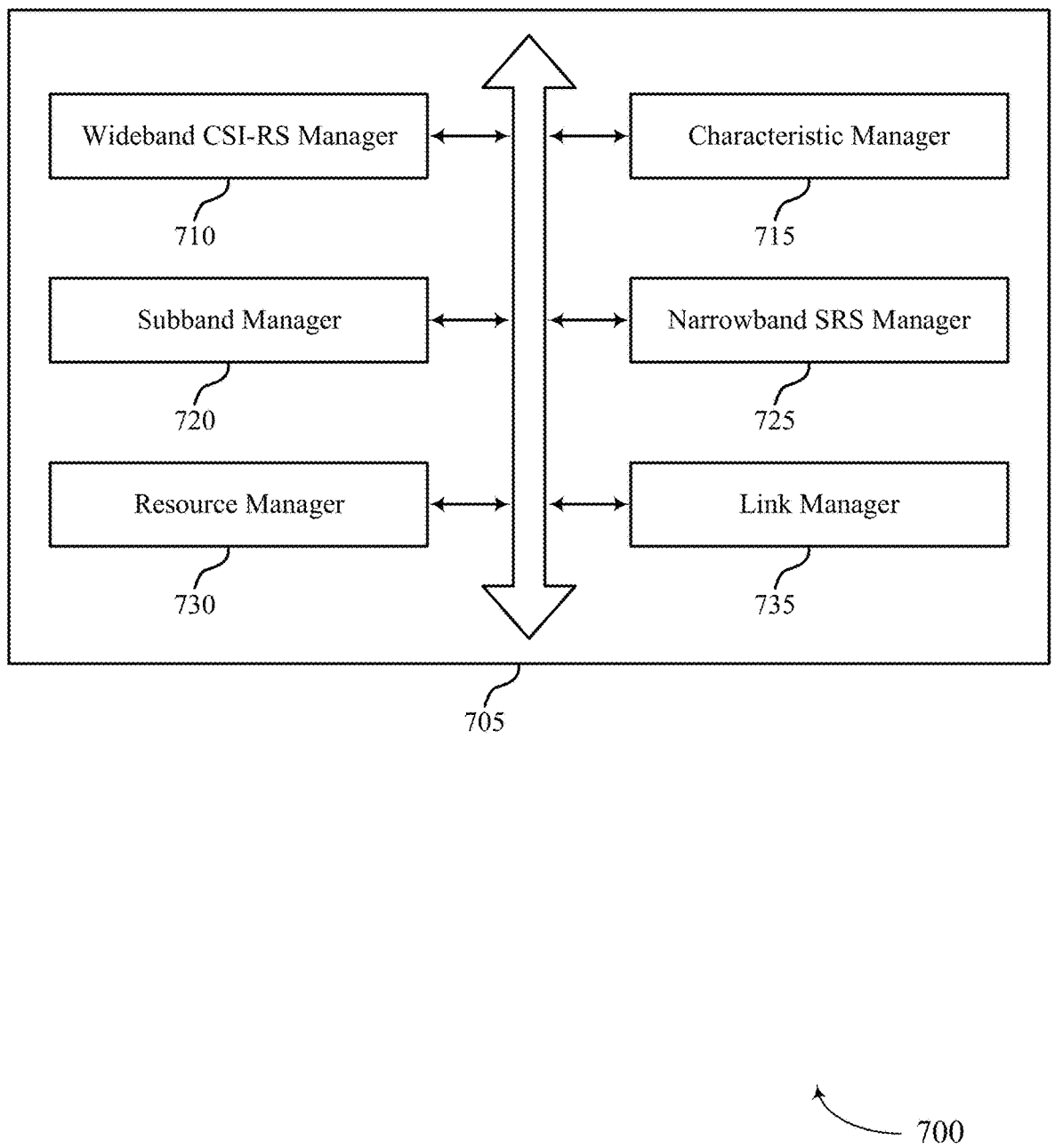
FIG. 7 shows a block diagram of a communications manager that supports feedback using wideband CSI in accordance with aspects of the present disclosure.

FIG. 7 shows a block diagram 700 of a communications manager 705 that supports feedback using wideband CSI in accordance with aspects of the present disclosure. The communications manager 705 may be an example of aspects of a communications manager 515, a communications manager 615, or a communications manager 810 described herein. The communications manager 705 may include a wideband CSI-RS manager 710, a characteristic manager 715, a subband manager 720, a narrowband SRS manager 725, a resource manager 730, and a link manager 735. Each of these modules may communicate, directly or indirectly, with one another (e.g., via one or more buses).

The wideband CSI-RS manager 710 may receive a wideband CSI-RS from a base station, the wideband CSI-RS including a set of subbands. In some cases, the wideband CSI-RS is communicated in a CoMP environment. In some cases, the wideband CSI-RS is communicated in a factory automation environment where a number of UEs exceeds a number of base stations.

The characteristic manager 715 may identify a characteristic of the received wideband CSI-RS. In some examples, the characteristic manager 715 may determine the characteristic of the wideband CSI-RS satisfies a threshold for the selected subband, where selecting the subband is based on determining the characteristic of the wideband CSI-RS satisfies the threshold. In some cases, the characteristic is a CQI, a RI, a PMI, or a combination thereof.

The subband manager 720 may select a subband from the set of subbands based on the identified characteristic of the received wideband CSI-RS. In some examples, the subband manager 720 may identify a set of subbands common to each of a set of wideband CSI-RSs, the characteristic of each subband in the set of subbands satisfying a threshold, where the selected subband is included in the set of subbands.

The narrowband SRS manager 725 may transmit a narrowband SRS based on the selected subband, where the narrowband SRS is associated with the selected subband. In some examples, the narrowband SRS manager 725 may transmit the narrowband SRS on the selected subband. In some examples, the narrowband SRS manager 725 may transmit the narrowband SRS in a first slot that is different from a second slot used to transmit one or more additional narrowband SRSs. In some cases, the narrowband SRS is transmitted to a set of base stations that includes the base station and one or more additional base stations.

The resource manager 730 may receive a message that allocates resources to the UE for communication with the base station based on transmitting the narrowband SRS, the resources being allocated for the selected subband.

The link manager 735 may communicate with the base station using the selected subband based on transmitting the narrowband SRS.

Figure 8:
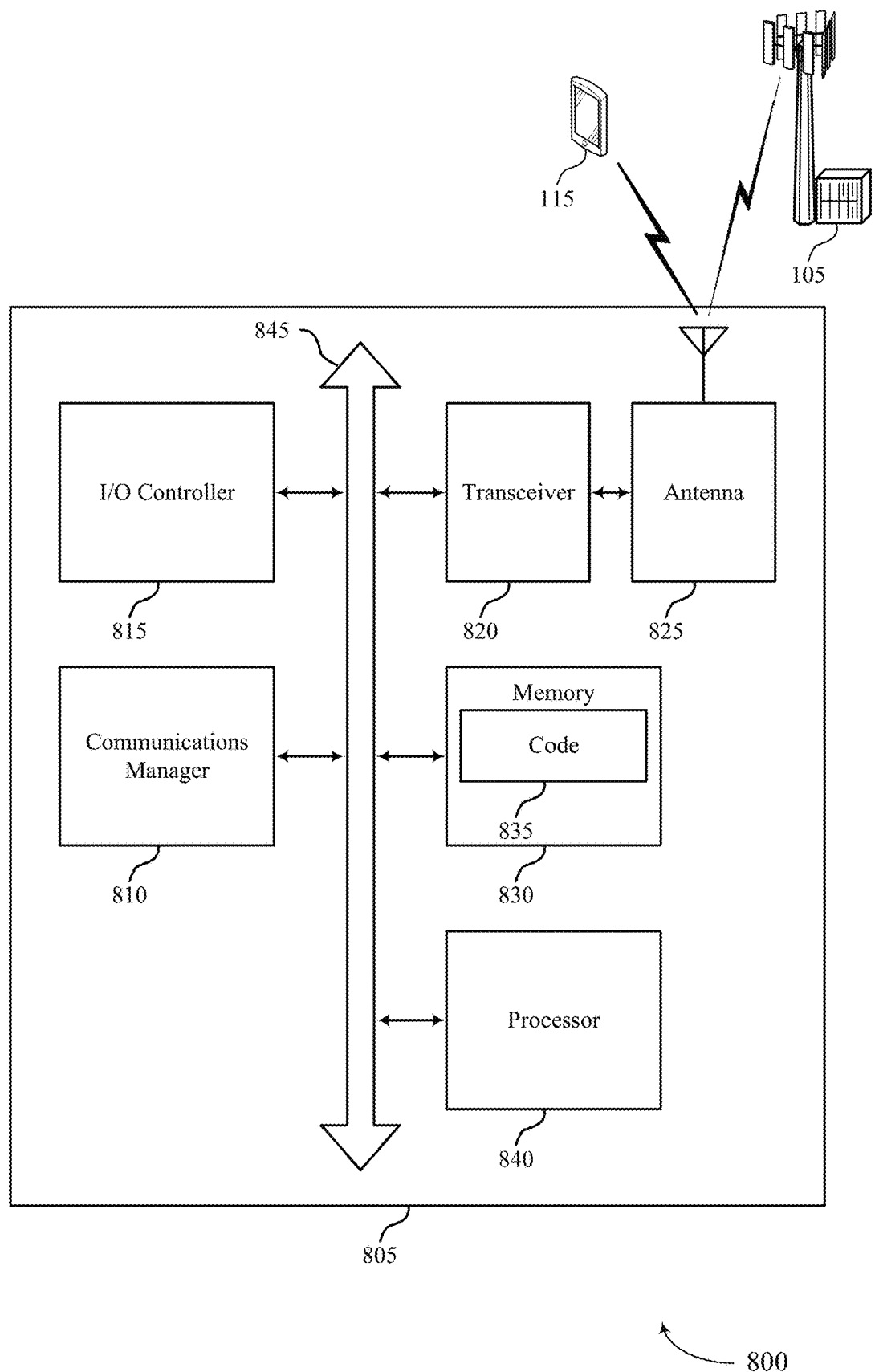
FIG. 8 shows a diagram of a system including a device that supports feedback using wideband CSI in accordance with aspects of the present disclosure.

FIG. 8 shows a diagram of a system 800 including a device 805 that supports feedback using wideband CSI in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a wideband CSI-RS from a base station, the wideband CSI-RS including a set of subbands, identify a characteristic of the received wideband CSI-RS, select a subband from the set of subbands based on the identified characteristic of the received wideband CSI-RS, and transmit a narrowband SRS based on the selected subband, where the narrowband SRS is associated with the selected subband.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM), read-only memory (ROM). The memory 830 may store computer-readable, computer-executable code 835 including instructions that, when executed, cause the processor to perform various functions described herein. In some cases, the memory 830 may contain, among other things, a basic input/basic output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting feedback using wideband CSI).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
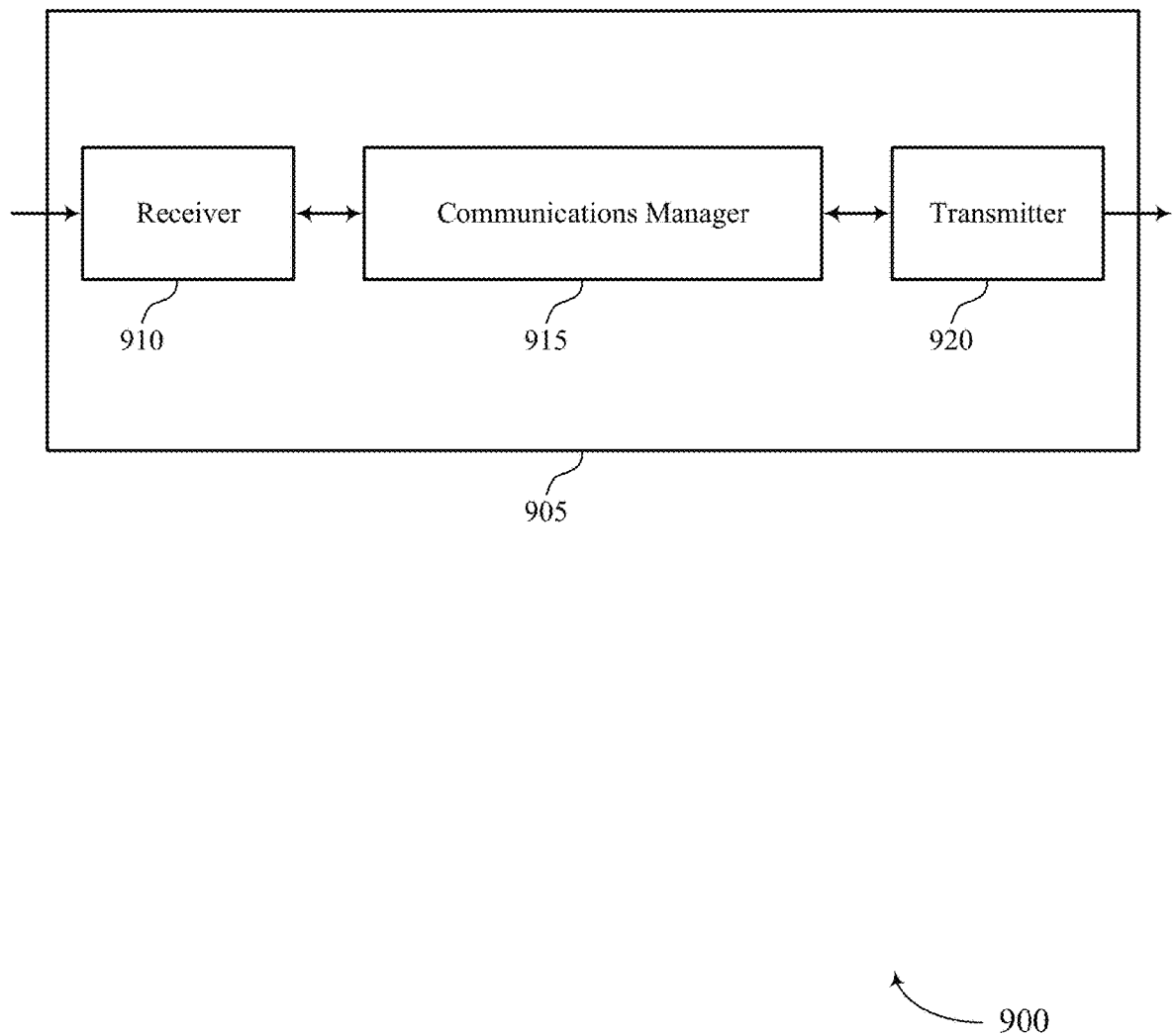
FIGS. 9 and 10 show block diagrams of devices that support feedback using wideband CSI in accordance with aspects of the present disclosure.

FIG. 9 shows a block diagram 900 of a device 905 that supports feedback using wideband CSI in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to feedback using wideband CSI). Information may be passed on to other components of the device 905. The receiver 910 may be an example of aspects of the transceiver 1220 described with reference to FIG. 12. The receiver 910 may utilize a single antenna or a set of antennas.

The communications manager 915 may broadcast a wideband CSI-RS, the wideband CSI-RS including a set of subbands, receive a narrowband SRS from a UE based on broadcasting the wideband CSI-RS, the narrowband SRS received by the base station indicating a subband of the set of subbands selected by the UE for communication, and communicate with the UE using the subband associated with the narrowband SRS received from the UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
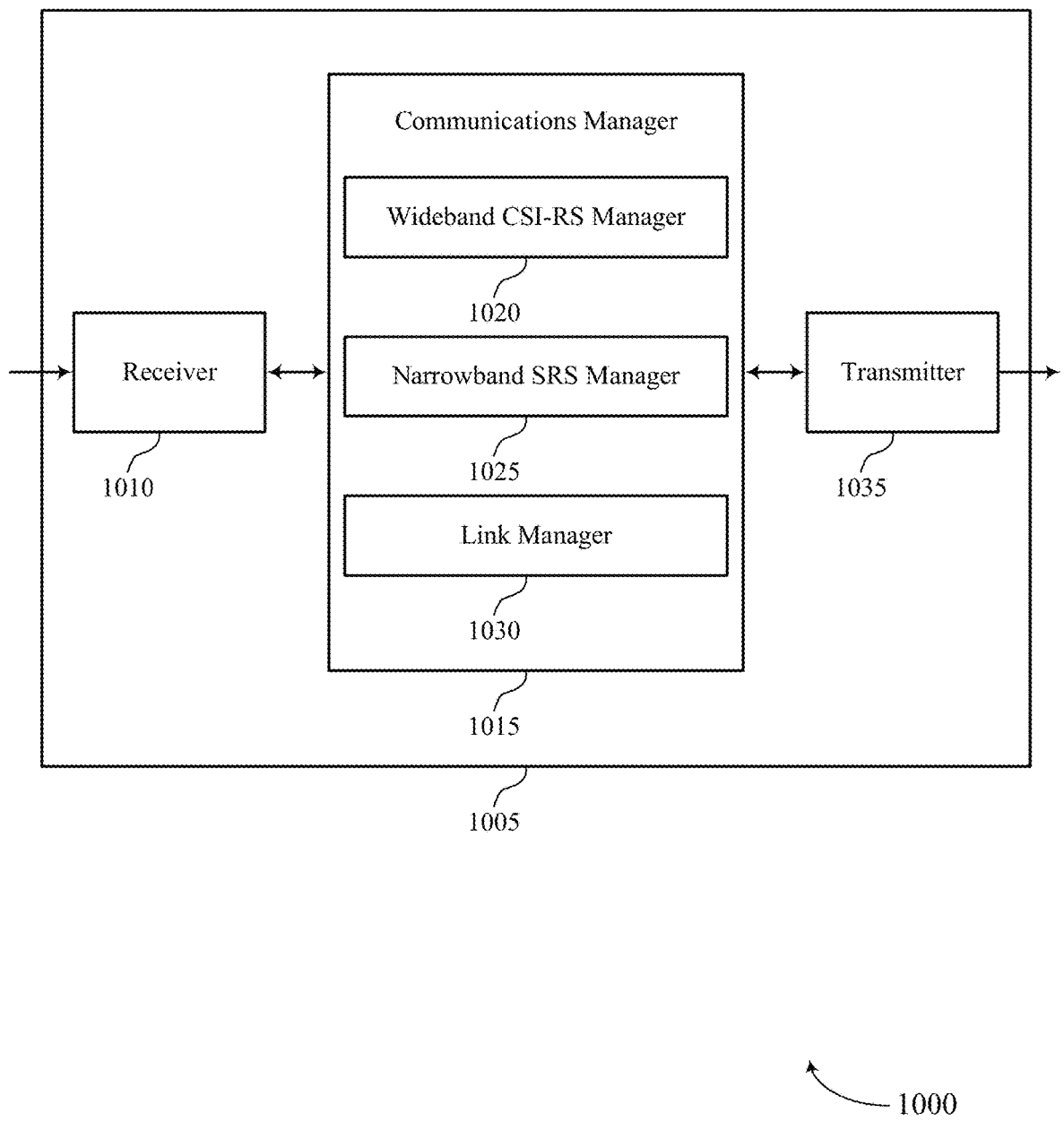

FIG. 10 shows a block diagram 1000 of a device 1005 that supports feedback using wideband CSI in accordance with aspects of the present disclosure. The device 1005 may be an example of aspects of a device 905 or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to feedback using wideband CSI). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a wideband CSI-RS manager 1020, a narrowband SRS manager 1025, and a link manager 1030. The communications manager 1015 may be an example of aspects of the communications manager 1210 described herein.

The wideband CSI-RS manager 1020 may broadcast a wideband channel state information reference signals (CSI-RS), the wideband CSI-RS including a set of subbands. The narrowband SRS manager 1025 may receive a narrowband SRS from a UE based on broadcasting the wideband CSI-RS, the narrowband SRS received by the base station indicating a subband of the set of subbands selected by the UE for communication. The link manager 1030 may communicate with the UE using the subband associated with the narrowband SRS received from the UE.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
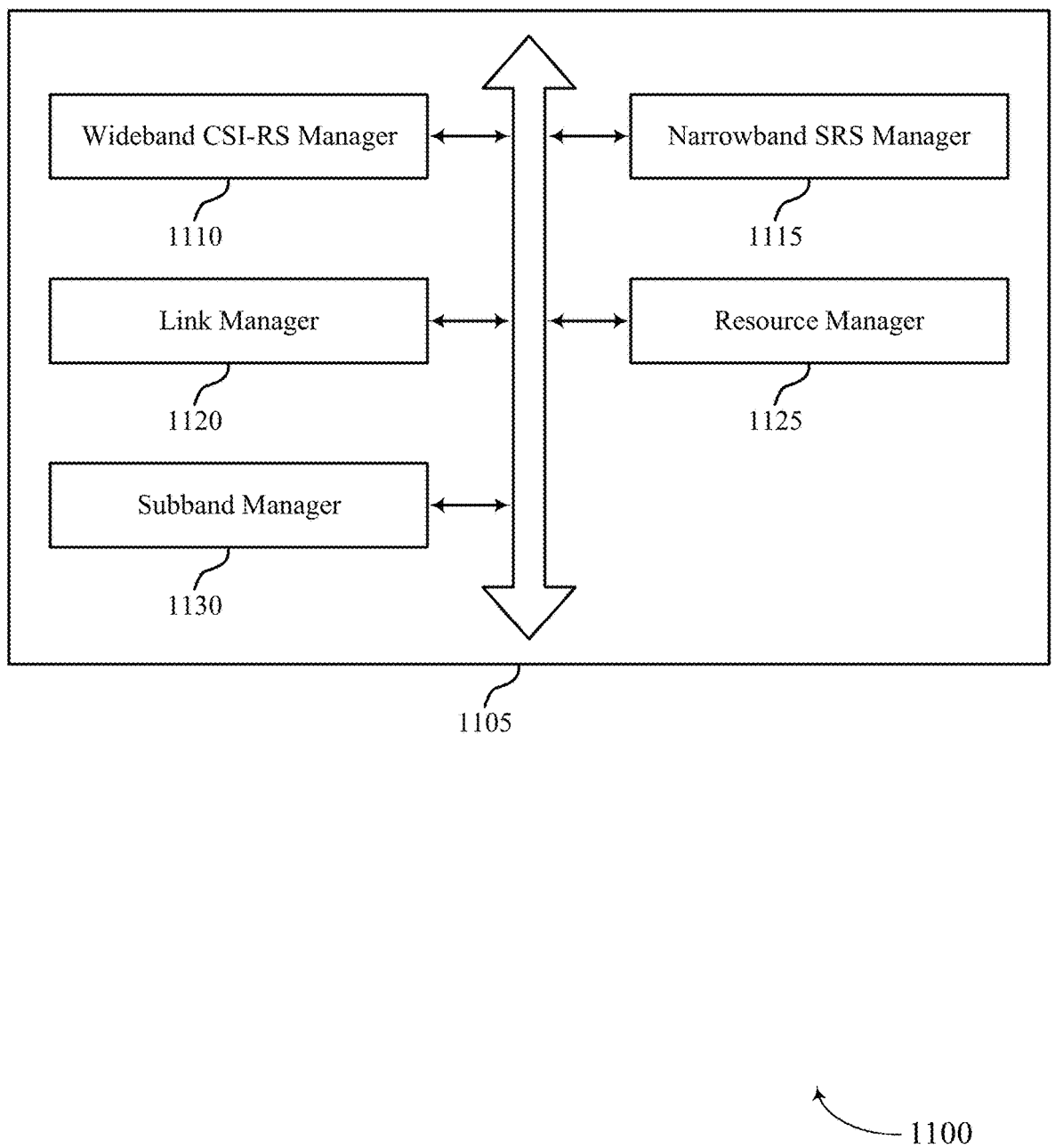
FIG. 11 shows a block diagram of a communications manager that supports feedback using wideband CSI in accordance with aspects of the present disclosure.

FIG. 11 shows a block diagram 1100 of a communications manager 1105 that supports feedback using wideband CSI in accordance with aspects of the present disclosure. The communications manager 1105 may be an example of aspects of a communications manager 915, a communications manager 1015, or a communications manager 1210 described herein. The communications manager 1105 may include a wideband CSI-RS manager 1110, a narrowband SRS manager 1115, a link manager 1120, a resource manager 1125, and a subband manager 1130. Each of these modules may communicate, directly or indirectly, with one another (e.g., via one or more buses).

The wideband CSI-RS manager 1110 may broadcast a wideband CSI-RS, the wideband CSI-RS including a set of subbands. In some cases, the wideband CSI-RS is communicated in a CoMP environment. In some cases, the wideband CSI-RS is communicated in a factory automation environment where a number of UEs exceeds a number of base stations.

The narrowband SRS manager 1115 may receive a narrowband SRS from a UE based on broadcasting the wideband CSI-RS, the narrowband SRS received by the base station indicating a subband of the set of subbands selected by the UE for communication. In some examples, the narrowband SRS manager 1115 may receive the narrowband SRS over the subband selected by the UE. In some examples, the narrowband SRS manager 1115 may receive the narrowband SRS in a first slot that is different than a second slot used to receive one or more additional narrowband SRSs. In some examples, the narrowband SRS manager 1115 may narrowband SRSs are received from a set of UEs.

The link manager 1120 may communicate with the UE using the subband associated with the narrowband SRS received from the UE.

The resource manager 1125 may transmit a message to the UE that allocates resources to the UE for communication based on receiving the narrowband SRS from the UE.

The subband manager 1130 may select at least one subband associated with a set of narrowband SRSs received from the UE, where communicating with the UE is based on selecting the at least one subband.

Figure 12:
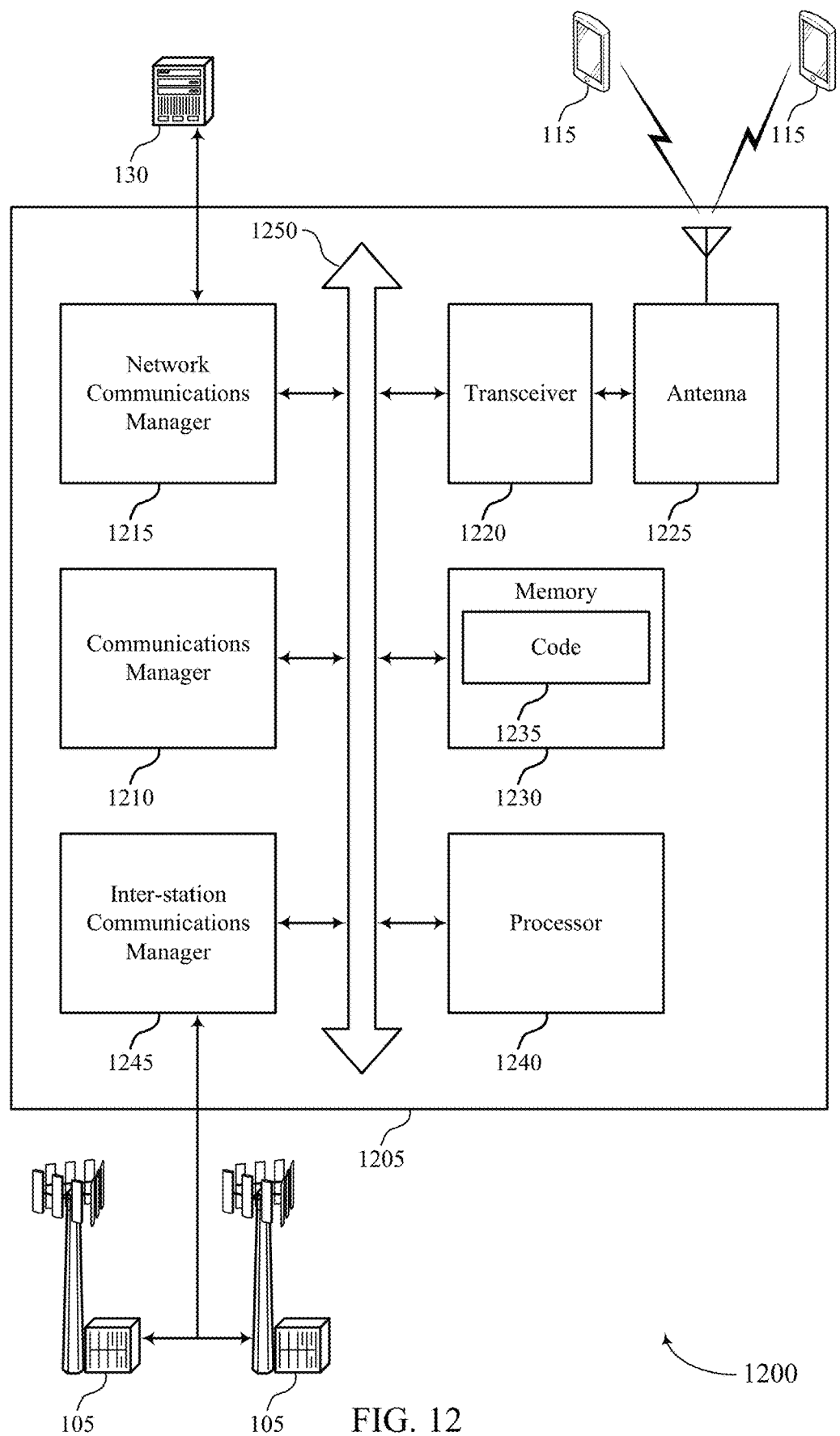
FIG. 12 shows a diagram of a system including a device that supports feedback using wideband CSI in accordance with aspects of the present disclosure.

FIG. 12 shows a diagram of a system 1200 including a device 1205 that supports feedback using wideband CSI in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may broadcast a wideband CSI-RS, the wideband CSI-RS including a set of subbands, receive a narrowband SRS from a UE based on broadcasting the wideband CSI-RS, the narrowband SRS received by the base station indicating a subband of the set of subbands selected by the UE for communication, and communicate with the UE using the subband associated with the narrowband SRS received from the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting feedback using wideband CSI).

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
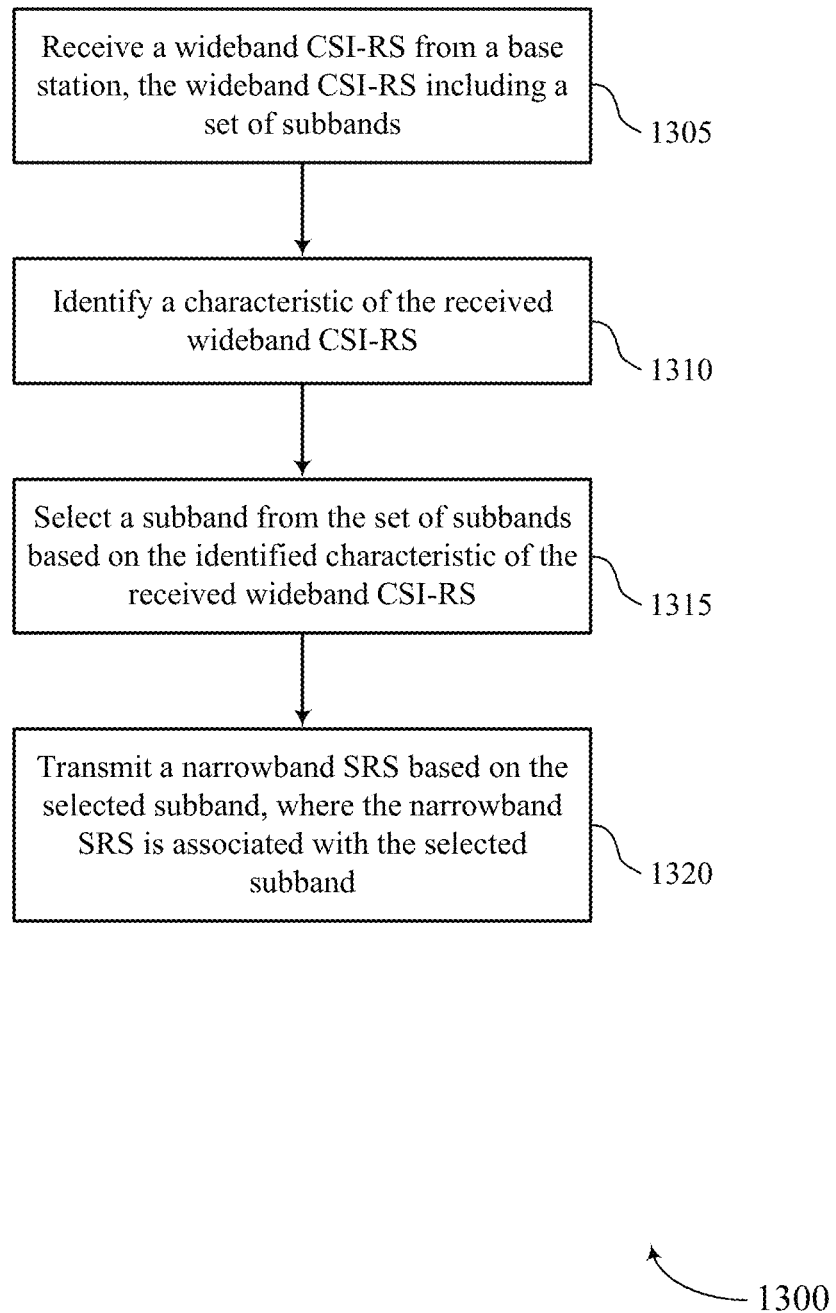
FIGS. 13 through 16 show flowcharts illustrating methods that support feedback using wideband CSI in accordance with aspects of the present disclosure.

FIG. 13 shows a flowchart illustrating a method 1300 that supports feedback using wideband CSI in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a wideband CSI-RS from a base station, the wideband CSI-RS including a set of subbands. The operations of 1305 may be performed according to the methods described herein. In some examples, aspects of the operations of 1305 may be performed by a wideband CSI-RS manager as described with reference to FIGS. 5 through 8.

At 1310, the UE may identify a characteristic of the received wideband CSI-RS. The operations of 1310 may be performed according to the methods described herein. In some examples, aspects of the operations of 1310 may be performed by a characteristic manager as described with reference to FIGS. 5 through 8.

At 1315, the UE may select a subband from the set of subbands based on the identified characteristic of the received wideband CSI-RS. The operations of 1315 may be performed according to the methods described herein. In some examples, aspects of the operations of 1315 may be performed by a subband manager as described with reference to FIGS. 5 through 8.

At 1320, the UE may transmit a narrowband SRS based on the selected subband, where the narrowband SRS is associated with the selected subband. The operations of 1320 may be performed according to the methods described herein. In some examples, aspects of the operations of 1320 may be performed by a narrowband SRS manager as described with reference to FIGS. 5 through 8.

Figure 14:
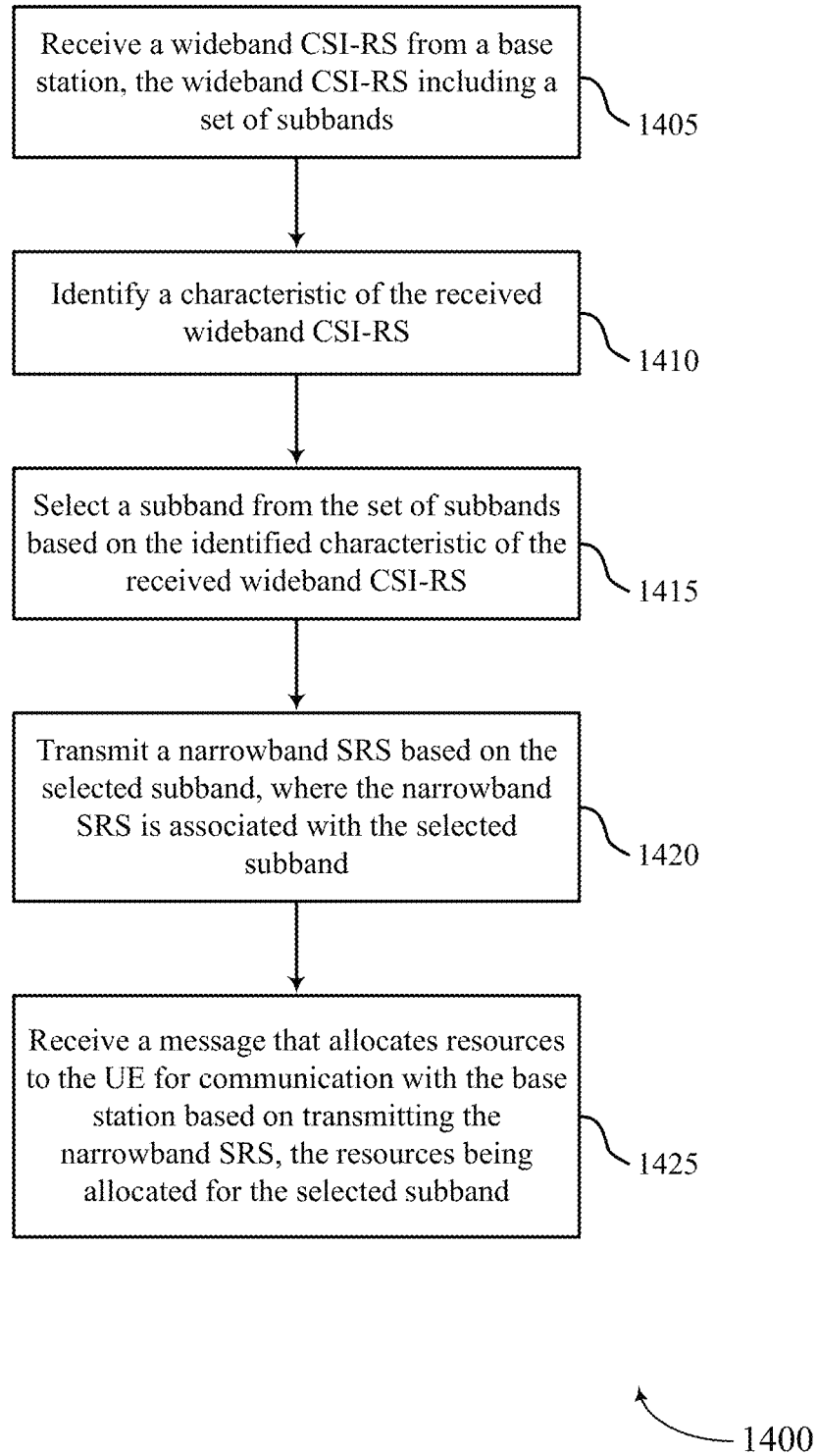

FIG. 14 shows a flowchart illustrating a method 1400 that supports feedback using wideband CSI in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a wideband CSI-RS from a base station, the wideband CSI-RS including a set of subbands. The operations of 1405 may be performed according to the methods described herein. In some examples, aspects of the operations of 1405 may be performed by a wideband CSI-RS manager as described with reference to FIGS. 5 through 8.

At 1410, the UE may identify a characteristic of the received wideband CSI-RS. The operations of 1410 may be performed according to the methods described herein. In some examples, aspects of the operations of 1410 may be performed by a characteristic manager as described with reference to FIGS. 5 through 8.

At 1415, the UE may select a subband from the set of subbands based on the identified characteristic of the received wideband CSI-RS. The operations of 1415 may be performed according to the methods described herein. In some examples, aspects of the operations of 1415 may be performed by a subband manager as described with reference to FIGS. 5 through 8.

At 1420, the UE may transmit a narrowband SRS based on the selected subband, where the narrowband SRS is associated with the selected subband. The operations of 1420 may be performed according to the methods described herein. In some examples, aspects of the operations of 1420 may be performed by a narrowband SRS manager as described with reference to FIGS. 5 through 8.

At 1425, the UE may receive a message that allocates resources to the UE for communication with the base station based on transmitting the narrowband SRS, the resources being allocated for the selected subband. The operations of 1425 may be performed according to the methods described herein. In some examples, aspects of the operations of 1425 may be performed by a resource manager as described with reference to FIGS. 5 through 8.

Figure 15:
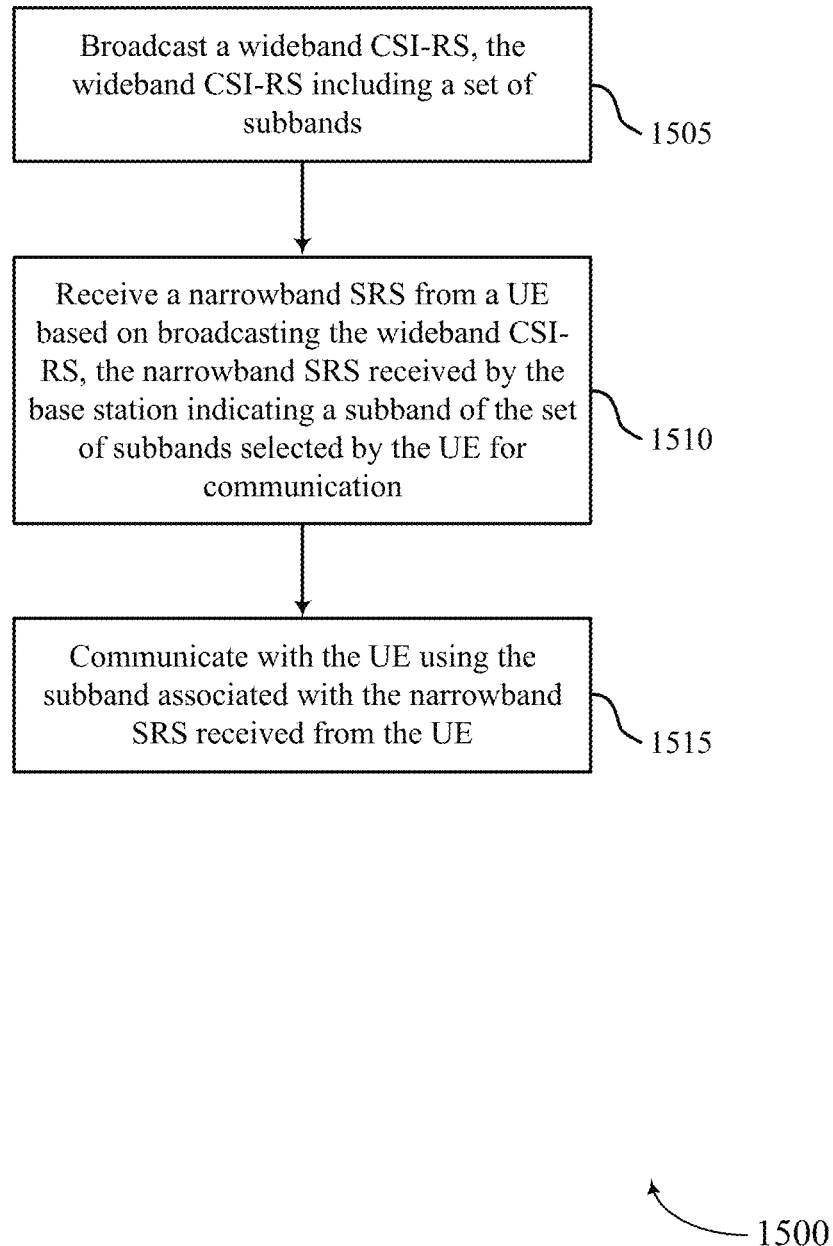

FIG. 15 shows a flowchart illustrating a method 1500 that supports feedback using wideband CSI in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may broadcast a wideband CSI-RS, the wideband CSI-RS including a set of subbands. The operations of 1505 may be performed according to the methods described herein. In some examples, aspects of the operations of 1505 may be performed by a wideband CSI-RS manager as described with reference to FIGS. 9 through 12.

At 1510, the base station may receive a narrowband SRS from a UE based on broadcasting the wideband CSI-RS, the narrowband SRS received by the base station indicating a subband of the set of subbands selected by the UE for communication. The operations of 1510 may be performed according to the methods described herein. In some examples, aspects of the operations of 1510 may be performed by a narrowband SRS manager as described with reference to FIGS. 9 through 12.

At 1515, the base station may communicate with the UE using the subband associated with the narrowband SRS received from the UE. The operations of 1515 may be performed according to the methods described herein. In some examples, aspects of the operations of 1515 may be performed by a link manager as described with reference to FIGS. 9 through 12.

Figure 16:
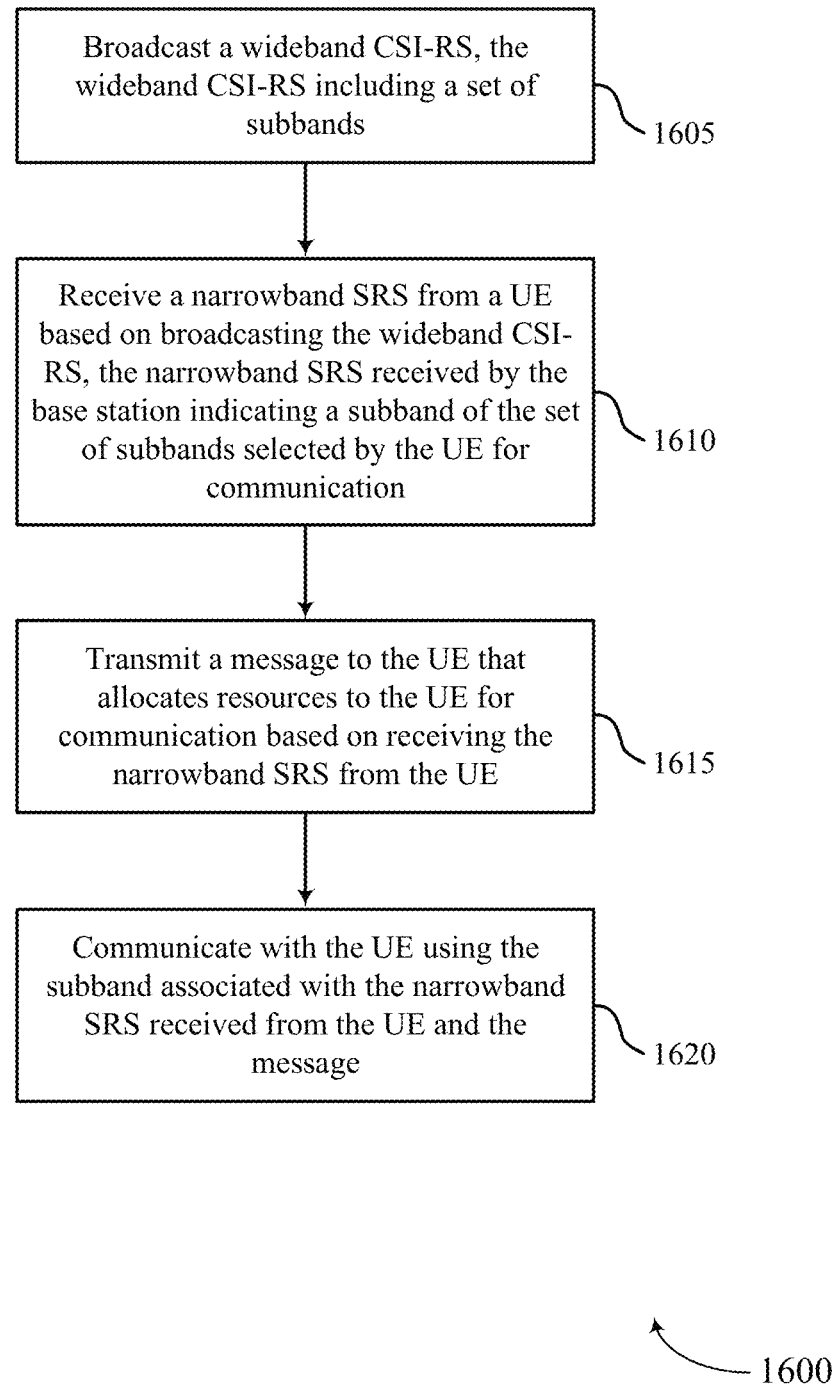

FIG. 16 shows a flowchart illustrating a method 1600 that supports feedback using wideband CSI in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may broadcast a wideband CSI-RS, the wideband CSI-RS including a set of subbands. The operations of 1605 may be performed according to the methods described herein. In some examples, aspects of the operations of 1605 may be performed by a wideband CSI-RS manager as described with reference to FIGS. 9 through 12.

At 1610, the base station may receive a narrowband SRS from a UE based on broadcasting the wideband CSI-RS, the narrowband SRS received by the base station indicating a subband of the set of subbands selected by the UE for communication. The operations of 1610 may be performed according to the methods described herein. In some examples, aspects of the operations of 1610 may be performed by a narrowband SRS manager as described with reference to FIGS. 9 through 12.

At 1615, the base station may transmit a message to the UE that allocates resources to the UE for communication based on receiving the narrowband SRS from the UE. The operations of 1615 may be performed according to the methods described herein. In some examples, aspects of the operations of 1615 may be performed by a resource manager as described with reference to FIGS. 9 through 12.

At 1620, the base station may communicate with the UE using the subband associated with the narrowband SRS received from the UE and the message. The operations of 1620 may be performed according to the methods described herein. In some examples, aspects of the operations of 1620 may be performed by a link manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home). An eNB for a macro cell may be referred to as a macro eNB. An eNB for a small cell may be referred to as a small cell eNB, a pico eNB, a femto eNB, or a home eNB. An eNB may support one or multiple (e.g., two, three, four) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   receiving a wideband channel state information reference signal (CSI-RS) from a base station, the wideband CSI-RS including a plurality of subbands;
   identifying a characteristic of the received wideband CSI-RS;
   determining the characteristic of the wideband CSI-RS satisfies a threshold for a subband;
   selecting the subband from the plurality of subbands based at least in part on determining the characteristic of the wideband CSI-RS satisfies the threshold; and
   transmitting a narrowband sounding reference signal (SRS) based at least in part on the selected subband, wherein the narrowband SRS is associated with the selected subband.

2. The method of claim 1, further comprising:
   identifying a set of subbands common to each of a plurality of wideband CSI-RSs, the characteristic of each subband in the set of subbands satisfying a threshold, wherein the selected subband is included in the set of subbands.

3. The method of claim 1, wherein transmitting the narrowband SRS further comprises:
   transmitting the narrowband SRS on the selected subband.

4. The method of claim 1, wherein transmitting the narrowband SRS further comprises:
   transmitting the narrowband SRS in a first slot that is different from a second slot used to transmit one or more additional narrowband SRSs.

5. The method of claim 1, wherein the narrowband SRS is transmitted to a set of base stations that includes the base station and one or more additional base stations.

6. The method of claim 1, further comprising:
   receiving a message that allocates resources to the UE for communication with the base station based at least in part on transmitting the narrowband SRS, the resources being allocated for the selected subband.

7. The method of claim 1, further comprising:
   communicating with the base station using the selected subband based at least in part on transmitting the narrowband SRS.

8. The method of claim 1, wherein the characteristic is a channel quality indicator (CQI), a rank indicator (RI), a precoder matrix indicator (PMI), or a combination thereof.

9. The method of claim 1, wherein the wideband CSI-RS is communicated in a coordinated multipoint (CoMP) environment.

10. The method of claim 1, wherein the wideband CSI-RS is communicated in a factory automation environment where a number of UEs exceeds a number of base stations.

11. A method for wireless communication by a base station, comprising:
    broadcasting a wideband channel state information reference signal (CSI-RS), the wideband CSI-RS including a plurality of subbands;
    receiving a narrowband sounding reference signal (SRS) from a user equipment (UE) based at least in part on broadcasting the wideband CSI-RS, the narrowband SRS received by the base station indicating a subband of the plurality of subbands selected by the UE for communication, wherein the receiving comprises receiving the narrowband SRS in a first slot is different than a second slot used to receive one or more additional narrowband SRSs; and
    communicating with the UE using the subband associated with the narrowband SRS received from the UE.

12. The method of claim 11, wherein receiving the narrowband SRS further comprises:
    receiving the narrowband SRS over the subband selected by the UE.

13. The method of claim 11, further comprising:
    transmitting a message to the UE that allocates resources to the UE for communication based at least in part on receiving the narrowband SRS from the UE.

14. The method of claim 11, further comprising:
    selecting at least one subband associated with a plurality of narrowband SRSs received from the UE, wherein communicating with the UE is based at least in part on selecting the at least one subband.

15. The method of claim 11, wherein the wideband CSI-RS is communicated in a coordinated multipoint (CoMP) environment.

16. The method of claim 11, wherein the wideband CSI-RS is communicated in a factory automation environment where a number of UEs exceeds a number of base stations.

17. The method of claim 11, wherein:
narrowband SRSs are received from a plurality of UEs.

18. An apparatus for wireless communication by a user equipment (UE), comprising: a processor, memory coupled with the processor; and instructions stored in the memory and executable by the processor to cause the apparatus to:
receive a wideband channel state information reference signal (CSI-RS) from a base station, the wideband CSI-RS including a plurality of subbands;
identify a characteristic of the received wideband CSI-RS;
determine the characteristic of the wideband CSI-RS satisfies a threshold for a subband;
select the subband from the plurality of subbands based at least in part on determining the characteristic of the wideband CSI-RS satisfies the threshold; and
transmit a narrowband sounding reference signal (SRS) based at least in part on the selected subband, wherein the narrowband SRS is associated with the selected subband.

19. The apparatus of claim 18, wherein the instructions to transmit the narrowband SRS are further executable by the processor to cause the apparatus to:
transmit the narrowband SRS on the selected subband.

20. The apparatus of claim 18, wherein the instructions to transmit the narrowband SRS further are executable by the processor to cause the apparatus to:
transmit the narrowband SRS in a first slot that is different from a second slot used to transmit one or more additional narrowband SRSs.

21. The apparatus of claim 18, wherein the narrowband SRS is transmitted to a set of base stations that includes the base station and one or more additional base stations.

22. The apparatus of claim 18, wherein the instructions are further executable by the processor to cause the apparatus to:
receive a message that allocates resources to the UE for communication with the base station based at least in part on transmitting the narrowband SRS, the resources being allocated for the selected subband.

23. An apparatus for wireless communication by a base station, comprising: a processor, memory coupled with the processor; and instructions stored in the memory and executable by the processor to cause the apparatus to:
broadcast a wideband channel state information reference signal (CSI-RS), the wideband CSI-RS including a plurality of subbands;
receive a narrowband sounding reference signal (SRS) from a user equipment (UE) based at least in part on broadcasting the wideband CSI-RS, the narrowband SRS received by the base station indicating a subband of the plurality of subbands selected by the UE for communication, wherein the instructions to receive the narrowband SRS further are executable by the processor to cause the apparatus to receive the narrowband SRS in a first slot is different than a second slot used to receive one or more additional narrowband SRSs; and
communicate with the UE using the subband associated with the narrowband SRS received from the UE.

24. The apparatus of claim 23, wherein the instructions to receive the narrowband SRS further are executable by the processor to cause the apparatus to:
receive the narrowband SRS over the subband selected by the UE.

25. The apparatus of claim 23, wherein the instructions are further executable by the processor to cause the apparatus to:
transmit a message to the UE that allocates resources to the UE for communication based at least in part on receiving the narrowband SRS from the UE.

26. The apparatus of claim 23, wherein the instructions are further executable by the processor to cause the apparatus to:
select at least one subband associated with a plurality of narrowband SRSs received from the UE, wherein communicating with the UE is based at least in part on selecting the at least one subband.

* * * * *